(12) United States Patent
Xie et al.

(10) Patent No.: US 12,108,331 B2
(45) Date of Patent: Oct. 1, 2024

(54) BWP ADJUSTMENT METHOD AND APPARATUS

(71) Applicant: HUAWEI TECHNOLOGIES CO., LTD., Guangdong (CN)

(72) Inventors: Xi Xie, Beijing (CN); Junren Chang, Beijing (CN); Xiangdong Zhang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 534 days.

(21) Appl. No.: 17/369,607

(22) Filed: Jul. 7, 2021

(65) Prior Publication Data
US 2021/0337472 A1  Oct. 28, 2021

Related U.S. Application Data

(63) Continuation of application No. PCT/CN2019/129145, filed on Dec. 27, 2019.

(30) Foreign Application Priority Data

Jan. 8, 2019 (CN) .................. 201910017002.4

(51) Int. Cl.
*H04W 52/02* (2009.01)
*H04W 72/0453* (2023.01)
*H04W 76/28* (2018.01)

(52) U.S. Cl.
CPC ... *H04W 52/0229* (2013.01); *H04W 72/0453* (2013.01); *H04W 76/28* (2018.02)

(58) Field of Classification Search
CPC ......... H04W 52/0216; H04W 52/0229; H04W 52/028; H04W 72/0453; H04W 76/28; H04W 24/02; G06F 1/3206; H04L 5/0007; Y02D 30/70
See application file for complete search history.

(56) References Cited

U.S. PATENT DOCUMENTS

2018/0332655 A1    11/2018  Ang et al.
2019/0132862 A1*    5/2019  Jeon ..................... H04L 5/0098
2021/0259044 A1*    8/2021  Islam .................. H04W 72/535

FOREIGN PATENT DOCUMENTS

CN    107979443 A      5/2018
KR    20160026882 A    3/2016
WO    2018076988 A1    5/2018

(Continued)

OTHER PUBLICATIONS

U.S. Appl. No. 62/732,466, Specification, Sep. 17, 2018 (Year: 2018).*

(Continued)

*Primary Examiner* — Chi H Pham
*Assistant Examiner* — Ji-Hae Yea
(74) *Attorney, Agent, or Firm* — Fish & Richardson P.C.

(57) ABSTRACT

This application provides example bandwidth part (BWP) adjustment methods and apparatuses. One example method includes receiving, in a first BWP, first indication information sent by a network side device, where the first indication information indicates information about a second BWP to be used by a terminal device to receive or send data. The terminal device can then receive or send the data in the second BWP.

20 Claims, 16 Drawing Sheets

(56) References Cited

FOREIGN PATENT DOCUMENTS

| WO | WO-2018144892 A1 * | 8/2018 | ........... H04L 5/0064 |
|---|---|---|---|
| WO | 2018204799 A1 | 11/2018 | |

OTHER PUBLICATIONS

Sony ("Conditions and procedures for adaption of power consumption characteristics", 3GPP TSG RAN WG1 Meeting #95, R1-1812750, Nov. 12-16, 2018) (Year: 2018).*

3GPP TS 38.213 V15.3.0 (Sep. 2018), "3rd Generation Partnership Project; Technical Specification Group Radio Access Network; NR; Physical layer procedures for control (Release 15)," Sep. 2018, 101 pages.

3GPP TS 38.321 V15.3.0 (Sep. 2018), "3rd Generation Partnership Project; Technical Specification Group Radio Access Network; NR; Medium Access Control (MAC) protocol specification (Release 15)," Sep. 2018, 76 pages.

3GPP TS 38.331 V15.3.0 (Sep. 2018), "3rd Generation Partnership Project; Technical Specification Group Radio Access Network; NR; Radio Resource Control (RRC) protocol specification (Release 15)," Sep. 2018, 445 pages.

Ericsson, "Triggers of NR UE power saving," 3GPP TSG-RAN WG1 Meeting #95, R1-1813183, Spokane, USA, Nov. 12-16, 2018, 5 pages.

Office Action issued in Chinese Application No. 201910017002.4 on Mar. 2, 2021, 17 pages (with English translation).

PCT International Search Report and Written Opinion issued in International Application No. PCT/CN2019/129145 on Mar. 25, 2020, 17 pages (with English translation).

Qualcomm Incorporated, "Triggering Adaptation of UE Power Consumption Characteristics," 3GPP TSG-RAN WG1 Meeting #94bis, R1-1811283, Chengdu, China, Oct. 8-12, 2018, 12 pages.

Extended European Search Report issued in European Application No. 19908403.9 on May 12, 2022, 22 pages.

Office Action issued in Indian Application No. 202137029547 on Mar. 8, 2022, 7 pages.

Qualcomm Incorporated, "Wake-Up Signaling for C-DRX," 3GPP TSG RAN WG2 RAN2#100, R2-1713803, Resubmission of R2-1711702, Reno, USA, Nov. 27-Dec. 1, 2017, 5 pages.

Ericsson, "Adaptation aspects of NR UE power saving," 3GPP TSG-RAN WG1 Meeting #94bis, Tdoc R1-1811501, Chengdu, China, Oct. 8-12, 2018, 4 pages.

Intel Corporation, "UE Adaptation to the traffic and UE power consumption," 3GPP TSG RAN WG1 Meeting #95, R1-1812513, Spokane, USA, Nov. 12-16, 2018, 12 pages.

Partial Supplementary European Search Report issued in European Application No. 19908403.9 on Dec. 23, 2021, 18 pages.

Samsung, "UE adaptation schemes," 3GPP TSG RAN WG1 Meeting #95, R1-1813011, Spokane, USA, Nov. 12-16, 2018, 12 pages.

Sony, "Conditions and procedures for adaptation of power consumption characteristics," 3GPP TSG RAN WG1 Meeting #95, R1-1812750, Spokane, USA, Nov. 12-16, 2018, 6 pages.

* cited by examiner

BWP ADJUSTMENT METHOD AND APPARATUS

CROSS-REFERENCE TO RELATED APPLICATIONS

This application is a continuation of International Application No. PCT/CN2019/129145, filed on Dec. 27, 2019, which claims priority to Chinese Patent Application No. 201910017002.4, filed on Jan. 8, 2019. The disclosures of the aforementioned applications are hereby incorporated by reference in their entireties.

TECHNICAL FIELD

This application relates to the field of communications technologies, and in particular, to a bandwidth part (BWP) adjustment method and apparatus.

BACKGROUND

Discontinuous reception (DRX) means: A user terminal (User Equipment, terminal device) periodically enters a sleep state at some time, and does not monitor a physical downlink control channel (PDCCH) subframe in the sleep state. When needing to monitor the PDCCH subframe, the terminal device is woken up from the sleep state. Therefore, power of the terminal device is saved.

A bandwidth of a 5G new radio (5G NR) system can reach a maximum of 400 MHz. If all terminal devices are required to support the maximum of 400 MHz, a high requirement is imposed on performance of the terminal device. This is adverse to reducing costs of the terminal device. Therefore, a bandwidth adaptation (BA) technology is introduced in 5G NR, so that a bandwidth of a BWP of a terminal device may be different from a bandwidth of a serving cell of the terminal device and may be adjusted. In a conventional technology, the BA technology is used by a terminal device to first detect, in a DRX cycle and in a narrowband BWP, whether wake up signaling (WUS) is received. If the WUS is received, the terminal device switches to a BWP with a higher bandwidth for data sending/receiving. After completing the data sending/receiving, the terminal device switches back to the narrowband BWP used to detect the WUS. If no WUS is detected, the terminal device remains in a sleep state, and is not woken up.

However, the manner in the conventional technology causes unnecessary overheads and power consumption of the terminal device.

SUMMARY

This application provides a BWP adjustment method and apparatus, to reduce unnecessary overheads and power consumption of a terminal device.

According to a first aspect, this application provides a bandwidth part BWP adjustment method. In this application, a network side device sends indication information to a terminal device, to indicate that an operating BWP to be used by the terminal device to receive and/or send data is a second BWP, so as to dynamically adjust the operating BWP of the terminal device. A BWP for receiving and/or sending data may be determined based on a data volume of data to be actually received and/or sent. Therefore, the operating BWP of the terminal device is more appropriate. In this way, unnecessary overheads and power consumption can be reduced.

Optionally, the first indication information is a go to sleep GTS signal, and the GTS signal includes information about the second BWP.

Optionally, if the first BWP is different from the second BWP,
the method further includes:
controlling the terminal device to enter a sleep state, and switching the operating BWP from the first BWP to the second BWP.

Optionally, the controlling the terminal device to enter a sleep state, and switching the operating BWP from the first BWP to the second BWP includes:
controlling the terminal device to enter the sleep state, and switching the operating BWP from the first BWP to the second BWP in the sleep state.

Optionally, the GTS signal is downlink control information DCI, the DCI includes a bandwidth indication field, and the bandwidth indication field is used to indicate the information about the second BWP.

Optionally, the GTS signal is a sequence-based signal, and the sequence-based signal corresponds to the second BWP.

Optionally, the first indication information is wake up signaling WUS, and the WUS includes information about the second BWP.

Optionally, if the first BWP is different from the second BWP,
the method further includes:
determining that the terminal device is to enter an active state, and switching the operating BWP from the first BWP to the second BWP; and
determining that the active state of the terminal device ends, and switching the operating BWP from the second BWP to the first BWP.

Optionally, the determining that the terminal device is to enter an active state, and switching the operating BWP from the first BWP to the second BWP includes:
switching the operating BWP from the first BWP to the second BWP before the terminal device enters the active state; and
the determining that the active state of the terminal device ends, and switching the operating BWP from the second BWP to the first BWP includes:
switching the operating BWP from the second BWP to the first BWP after the active state of the terminal device ends.

Optionally, if a quantity of times for which the terminal device switches from the first BWP to the second BWP is greater than a preset threshold, the terminal device maintains the second BWP as the operating BWP after the active state of the terminal device ends.

Optionally, the WUS is a sequence-based signal, and the sequence-based signal corresponds to the second BWP.

Optionally, before the receiving, in a first BWP, first indication information sent by a network side device, the method further includes:
receiving BWP configuration information sent by the network side device, where the BWP configuration information includes configuration information of an active BWP, an initial BWP, and a default BWP, and the second BWP is the active BWP, the initial BWP, or the default BWP.

Optionally, before the receiving, in a first BWP, first indication information sent by a network side device, the method further includes:
receiving BWP configuration information sent by the network side device, where the BWP configuration information includes at least two sets of BWP configuration information, and the second BWP is a BWP corresponding to one of the at least two sets of BWP configuration information.

Optionally, the receiving BWP configuration information sent by the network side device includes:

receiving radio resource control RRC signaling sent by the network side device, where the RRC signaling includes the BWP configuration information.

Optionally, the RRC signaling further includes DRX configuration information respectively corresponding to the at least two sets of BWP configuration information.

Optionally, the method further includes:

receiving BWP reconfiguration information sent by the network side device; and updating the at least two sets of BWP configuration information based on the BWP reconfiguration information.

Optionally, the method further includes:

obtaining a sending time of the WUS; and receiving, in the first BWP and at the sending time of the WUS, the wake up signaling WUS sent by the network side device.

According to a second aspect, this application provides a bandwidth part BWP adjustment method, including:

determining a second BWP based on data to be received and/or sent by a terminal device; and sending first indication information to the terminal device in a first BWP, where the first indication information is used to indicate information about the second BWP to be used by the terminal device to receive and/or send the data, and is used to indicate the terminal device to enter a sleep state or a wake-up state.

Optionally, the first indication information is a go to sleep GTS signal, and the GTS signal includes the information about the second BWP.

Optionally, the GTS signal is downlink control information DCI, the DCI includes a bandwidth indication field, and the bandwidth indication field is used to indicate the information about the second BWP.

Optionally, the GTS signal is a sequence-based signal, and the sequence-based signal corresponds to the second BWP.

Optionally, the first indication information is wake up signaling WUS, and the WUS includes the information about the second BWP.

Optionally, the WUS is a sequence-based signal, and the sequence-based signal corresponds to the second BWP.

Optionally, before the sending first indication information to the terminal device in a first BWP, the method further includes:

sending BWP configuration information to the terminal device, where the BWP configuration information includes configuration information of an active BWP, an initial BWP, and a default BWP, and the second BWP is the active BWP, the initial BWP, or the default BWP.

Optionally, before the sending first indication information to the terminal device, the method further includes:

sending BWP configuration information to the terminal device, where the BWP configuration information includes at least two sets of BWP configuration information, and the second BWP is a BWP corresponding to one of the at least two sets of BWP configuration information.

Optionally, the sending BWP configuration information to the terminal device includes:

sending radio resource control RRC signaling to the terminal device, where the RRC signaling includes the BWP configuration information.

Optionally, the RRC signaling further includes DRX configuration information corresponding to the at least two sets of BWP configuration information.

According to a third aspect, this application provides a method for determining a monitoring time of wake up signaling WUS, including:

obtaining a start moment of an on duration timer; and determining a monitoring time of the WUS based on the start moment of the on duration timer.

Optionally, the determining a monitoring time of the WUS based on the start moment of the on duration timer includes:

determining the monitoring time of the WUS based on the start moment of the on duration timer and a first offset, where the first offset is an offset between a sending moment of the WUS and the start moment of the on duration timer.

Optionally, the determining the monitoring time of the WUS based on the start moment of the on duration timer and a first offset includes:

determining the monitoring time of the WUS based on a start moment of on duration, a second offset, and the first offset, where the second offset is a slot offset of discontinuous reception DRX.

Optionally, the determining the monitoring time of the WUS based on a start moment of on duration, a second offset, and the first offset includes:

determining the monitoring time of the WUS according to $T_{WUS}=T_{on\text{-}duration}+\Delta_{slot\text{-}offset}\pm\Delta_{WUS\text{-}offset}$, where $T_{WUS}$ is a reference point of the monitoring time of the WUS, $T_{on\text{-}duration}$ is the start moment of the on duration, $\Delta_{slot\text{-}offset}$ is the second offset, $\Delta_{WUS\text{-}offset}$ is the first offset, and the monitoring time of the WUS is the moment $T_{WUS}$ or a time period including the moment $T_{WUS}$.

Optionally, the determining a monitoring time of the WUS based on the start moment of the on duration timer includes:

determining the start moment of the on duration timer as the monitoring time of the WUS.

Optionally, before the determining the start moment of the on duration timer as the monitoring time of the WUS, the method further includes:

determining the start moment of the on duration timer based on a start moment of on duration and a second offset.

Optionally, the determining the start moment of the on duration timer based on a start moment of on duration and a second offset includes:

determining the start moment of the on duration timer according to $T_{start}=T_{on\text{-}duration}+\Delta_{slot\text{-}offset}$, where $T_{on\text{-}duration}$ is the start moment of the on duration, $\Delta_{slot\text{-}offset}$ is the second offset, and $T_{start}$ is the start moment of the on duration timer.

Optionally, the determining a monitoring time of the WUS based on the start moment of the on duration timer includes:

determining the monitoring time of the WUS based on a start moment of on duration and a second offset.

Optionally, the determining the monitoring time of the WUS based on a start moment of on duration and a second offset includes:

determining the monitoring time of the WUS according to $T_{WUS}=T_{on\text{-}duration}+\Delta_{slot\text{-}offset}$, where $T_{on\text{-}duration}$ is the start moment of the on duration, $\Delta_{slot\text{-}offset}$ is the second offset, $T_{WUS}$ is a reference point of the monitoring time of the WUS, and the monitoring time of the WUS is the moment $T_{WUS}$ or a time period including the moment $T_{WUS}$.

Optionally, the determining a monitoring time of the WUS based on the start moment of the on duration timer includes:

determining the start moment of the on duration timer based on a start moment of on duration and a second offset; and determining a time period from the start moment of the on duration to the start moment of the on duration timer as the monitoring time of the WUS.

Optionally, the determining a monitoring time of the WUS based on the start moment of the on duration timer includes:

determining the start moment of the on duration timer based on a start moment of on duration and a second offset; and determining, as the monitoring time of the WUS, a time period that corresponds to the second offset and that is before the start moment of the on duration timer.

Optionally, the determining a monitoring time of the WUS based on the start moment of the on duration timer includes:

determining, as the monitoring time of the WUS, a time period that corresponds to a second offset and that is after a start moment of on duration.

According to a fourth aspect, this application provides a bandwidth part BWP adjustment apparatus, including:

a receiver, configured to receive, in a first BWP, first indication information sent by a network side device, where the first indication information is used to indicate information about a second BWP to be used by a terminal device to receive and/or send data, and is used to indicate the terminal device to enter a sleep state or a wake-up state.

The receiver is further configured to receive the data in the second BWP, and/or a transmitter is configured to send the data in the second BWP.

Optionally, the first indication information is a go to sleep GTS signal, and the GTS signal includes the information about the second BWP.

Optionally, if the first BWP is different from the second BWP, the apparatus further includes:

a processor, configured to control the terminal device to enter the sleep state, and switch an operating BWP from the first BWP to the second BWP.

Optionally, the processor is specifically configured to control the terminal device to enter the sleep state, and switch the operating BWP from the first BWP to the second BWP in the sleep state.

Optionally, the GTS signal is downlink control information DCI, the DCI includes a bandwidth indication field, and the bandwidth indication field is used to indicate the information about the second BWP.

Optionally, the GTS signal is a sequence-based signal, and the sequence-based signal corresponds to the second BWP.

Optionally, the first indication information is wake up signaling WUS, and the WUS includes the information about the second BWP.

Optionally, if the first BWP is different from the second BWP, the apparatus further includes:

a processor, configured to: determine that the terminal device is to enter an active state, and switch an operating BWP from the first BWP to the second BWP; and determine that the active state of the terminal device ends, and switch the operating BWP from the second BWP to the first BWP.

Optionally, the processor is specifically configured to switch the operating BWP from the first BWP to the second BWP before the terminal device enters the active state, and switch the operating BWP from the second BWP to the first BWP after the active state of the terminal device ends.

Optionally, the processor is further configured to: if a quantity of times for which the terminal device switches from the first BWP to the second BWP is greater than a preset threshold, maintain, by the terminal device, the second BWP as the operating BWP after the active state of the terminal device ends.

Optionally, the WUS is a sequence-based signal, and the sequence-based signal corresponds to the second BWP.

Optionally, the receiver is further configured to receive BWP configuration information sent by the network side device, where the BWP configuration information includes configuration information of an active BWP, an initial BWP, and a default BWP, and the second BWP is the active BWP, the initial BWP, or the default BWP.

Optionally, the receiver is further configured to receive BWP configuration information sent by the network side device, where the BWP configuration information includes at least two sets of BWP configuration information, and the second BWP is a BWP corresponding to one of the at least two sets of BWP configuration information.

Optionally, the receiver is further configured to receive radio resource control RRC signaling sent by the network side device, where the RRC signaling includes the BWP configuration information.

Optionally, the RRC signaling further includes DRX configuration information respectively corresponding to the at least two sets of BWP configuration information.

Optionally, the receiver is further configured to receive BWP reconfiguration information sent by the network side device. The processor is further configured to update the at least two sets of BWP configuration information based on the BWP reconfiguration information.

Optionally, the processor is further configured to obtain a sending time of the WUS.

The transmitter is further configured to receive, in the first BWP and at the sending time of the WUS, the wake up signaling WUS sent by the network side device.

According to a fifth aspect, this application provides a bandwidth part BWP adjustment apparatus, including:

a processor, configured to determine a second BWP based on data to be received and/or sent by a terminal device; and a transmitter, configured to send first indication information to the terminal device in a first BWP, where the first indication information is used to indicate information about the second BWP to be used by the terminal device to receive and/or send the data, and is used to indicate the terminal device to enter a sleep state or a wake-up state.

Optionally, the first indication information is a go to sleep GTS signal, and the GTS signal includes the information about the second BWP.

Optionally, the GTS signal is downlink control information DCI, the DCI includes a bandwidth indication field, and the bandwidth indication field is used to indicate the information about the second BWP.

Optionally, the GTS signal is a sequence-based signal, and the sequence-based signal corresponds to the second BWP.

Optionally, the first indication information is wake up signaling WUS, and the WUS includes the information about the second BWP.

Optionally, the WUS is a sequence-based signal, and the sequence-based signal corresponds to the second BWP.

Optionally, the transmitter is further configured to send BWP configuration information to the terminal device, where the BWP configuration information includes configuration information of an active BWP, an initial BWP, and a default BWP, and the second BWP is the active BWP, the initial BWP, or the default BWP.

Optionally, the transmitter is further configured to send BWP configuration information to the terminal device, where the BWP configuration information includes at least two sets of BWP configuration information, and the second BWP is a BWP corresponding to one of the at least two sets of BWP configuration information.

Optionally, the transmitter is specifically configured to send radio resource control RRC signaling to the terminal device, where the RRC signaling includes the BWP configuration information.

Optionally, the RRC signaling further includes DRX configuration information corresponding to the at least two sets of BWP configuration information.

According to a sixth aspect, this application provides an apparatus for determining a monitoring time of wake up signaling WUS, including:

a processor, configured to obtain a start moment of an on duration timer.

The processor is further configured to determine a monitoring time of the WUS based on the start moment of the on duration timer.

Optionally, the processor is specifically configured to determine the monitoring time of the WUS based on the start moment of the on duration timer and a first offset, where the first offset is an offset between a sending moment of the WUS and the start moment of the on duration timer.

Optionally, the processor is specifically configured to determine the monitoring time of the WUS based on a start moment of on duration, a second offset, and the first offset, where the second offset is a slot offset of discontinuous reception DRX.

Optionally, the processor is specifically configured to:
determine the monitoring time of the WUS according to $T_{WUS}=T_{on\text{-}duration}+\Delta_{slot\_offset}\pm\Delta_{WUS\text{-}offset}$, where $T_{WUS}$ is a reference point of the monitoring time of the WUS, $T_{on\text{-}duration}$ is the start moment of the on duration, $\Delta_{slot\_offset}$ is the second offset, $\Delta_{WUS\text{-}offset}$ is the first offset, and the monitoring time of the WUS is the moment $T_{WUS}$ or a time period including the moment $T_{WUS}$.

Optionally, the processor is specifically configured to determine the start moment of the on duration timer as the monitoring time of the WUS.

Optionally, the processor is further configured to determine the start moment of the on duration timer based on a start moment of on duration and a second offset.

Optionally, the processor is specifically configured to determine the start moment of the on duration timer according to $T_{start}=T_{on\text{-}duration}+\Delta_{slot\_offset}$, where $T_{on\text{-}duration}$ is the start moment of the on duration, $\Delta_{slot\_offset}$ is the second offset, and $T_{start}$ is the start moment of the on duration timer.

Optionally, the processor is specifically configured to determine the monitoring time of the WUS based on a start moment of on duration and a second offset.

Optionally, the processor is specifically configured to determine the monitoring time of the WUS according to $T_{WUS}=T_{on\text{-}duration}+\Delta_{slot\_offset}$, where $T_{on\text{-}duration}$ is the start moment of the on duration, $\Delta_{slot\_offset}$ is the second offset, $T_{WUS}$ is a reference point of the monitoring time of the WUS, and the monitoring time of the WUS is the moment $T_{WUS}$ or a time period including the moment $T_{WUS}$.

Optionally, the processor is specifically configured to:
determine the start moment of the on duration timer based on a start moment of on duration and a second offset; and determine a time period from the start moment of the on duration to the start moment of the on duration timer as the monitoring time of the WUS.

Optionally, the processor is specifically configured to:
determine the start moment of the on duration timer based on a start moment of on duration and a second offset; and determine, as the monitoring time of the WUS, a time period that corresponds to the second offset and that is before the start moment of the on duration timer.

Optionally, the processor is specifically configured to determine, as the monitoring time of the WUS, a time period that corresponds to a second offset and that is after a start moment of on duration.

According to a seventh aspect, this application provides a computer-readable storage medium, storing a computer program. When the program is executed by a processor, the bandwidth part BWP adjustment method according to the first aspect is implemented.

According to an eighth aspect, this application provides a computer-readable storage medium, storing a computer program. When the program is executed by a processor, the bandwidth part BWP adjustment method according to the second aspect is implemented.

According to a ninth aspect, this application provides a computer-readable storage medium, storing a computer program. When the program is executed by a processor, the method for determining a monitoring time of wake up signaling WUS according to the third aspect is implemented.

According to a tenth aspect, this application provides a bandwidth part BWP adjustment apparatus, including a memory, a processor, and a program that is stored in the memory and that can run on the processor. When the processor executes the program, the bandwidth part BWP adjustment method according to the first aspect is implemented.

According to an eleventh aspect, this application provides a bandwidth part BWP adjustment apparatus, including a memory, a processor, and a program that is stored in the memory and that can run on the processor. When the processor executes the program, the bandwidth part BWP adjustment method according to the second aspect is implemented.

According to a twelfth aspect, this application provides an apparatus for determining a monitoring time of wake up signaling WUS, including a memory, a processor, and a program that is stored in the memory and that can run on the processor. When the processor executes the program, the method for determining a monitoring time of wake up signaling WUS according to the third aspect is implemented.

DESCRIPTION OF EMBODIMENTS

Figure 1:
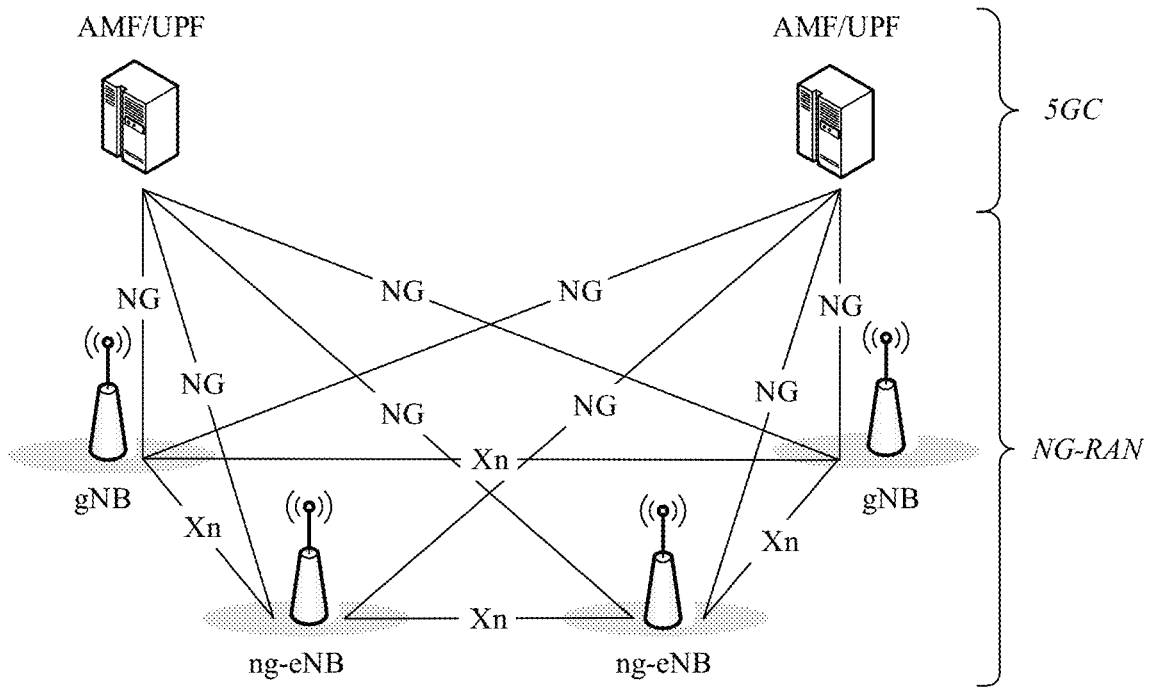
FIG. 1 is an architectural diagram of an application system according to this application.

FIG. 1 is an architectural diagram of an application system according to this application. Technical solutions of this application are applied to a 5G system. The 5G system is also referred to as a new radio communications system, a new access technology (New Radio, NR) system, or a next-generation mobile communications system. A base station gNB/NG-eNB of a serving cell of a terminal device is responsible for providing 5G NR user plane and control plane protocol functions for the terminal device.

An access network in the 5G system may be a radio access network ((R)AN), and an (R)AN device in the 5G system may include a plurality of 5G-(R)AN nodes. The 5G-(R)AN nodes may include an access point (AP) in a non-3GPP access network such as a Wi-Fi network, and a next generation NodeB (which may be collectively referred to as a next generation radio access network node (NG-RAN node)). The next generation NodeB includes a new radio NodeB (NR NodeB, gNB), a next generation evolved NodeB (NG-eNB), a gNB in which a central unit (CU) is separated from a distributed unit (DU), a transmission reception point (TRP), a transmission point (TP), or another node.

As shown in FIG. 1, a 5G core/next generation core network (5GC/NGC) includes a plurality of function units such as an access and mobility management function (AMF) network element, a session management function (SMF) network element, a user plane function (UPF) network element, an authentication server function (AUSF) network element, a policy control function (PCF) network element, an application function (AF) network element, a unified data management (UDM) network element, and a network slice selection function (NSSF) network element.

The AMF network element is mainly responsible for services such as mobility management and access management. The SMF network element is mainly responsible for session management, address management and assignment of a terminal device, a dynamic host configuration protocol function, selection and control of a user plane function, and the like. The UPF is mainly responsible for functions related to external connection to a data network (DN), user plane data packet routing and forwarding, packet filtering, quality of service (, QoS) control, and the like. The AUSF is mainly responsible for an authentication function of the terminal device, and the like. The PCF network element is mainly responsible for providing a unified policy framework for network behavior management, providing a policy rule of a control plane function, obtaining registration information related to a policy decision, and so on. It should be noted that these function units may work independently, or may be combined together to implement some control functions, for example, access control and mobility management functions such as access authentication, security encryption, and location registration of the terminal device, and session management functions such as establishment, release, and change of a user plane transmission path.

The function units in the 5GC may communicate with each other through a next generation (NG) network interface. For example, the terminal device may transmit a control plane message with the AMF network element through an NG interface 1 (N1 for short). The RAN device may establish a user plane data transmission channel with the UPF through an NG interface 3 (N3 for short). The AN/RAN device may establish a control plane signaling connection to the AMF network element through an NG interface 2 (N2 for short). The UPF may exchange information with the SMF network element through an NG interface 4 (N4 for short). The UPF may exchange user plane data with the data network DN through an NG interface 6 (N6 for short). The AMF network element may exchange information with the SMF network element through an NG interface 11 (N11 for short). The SMF network element may exchange information with the PCF network element through an NG interface 7 (N7 for short). The AMF network element may exchange information with the AUSF through an NG interface 12 (N12 for short). It should be noted that FIG. 1 is merely an architectural diagram used an example. The network architecture may further include another function unit in addition to the function units shown in FIG. 1.

In this application, a network side device sends indication information to a terminal device, to indicate an operating BWP to be used by the terminal device to receive and/or send data, so that the operating BWP of the terminal device can be dynamically adjusted based on a size of a data volume of data to be actually received and/or sent. Because the operating BWP of the terminal device is more appropriate, unnecessary overheads and power consumption can be reduced. The operating BWP is a BWP used for data transmission.

The following describes the technical solutions of this application by using several specific embodiments. For same or similar descriptions, refer to each other. Details are not described in this application one by one.

Figure 2:
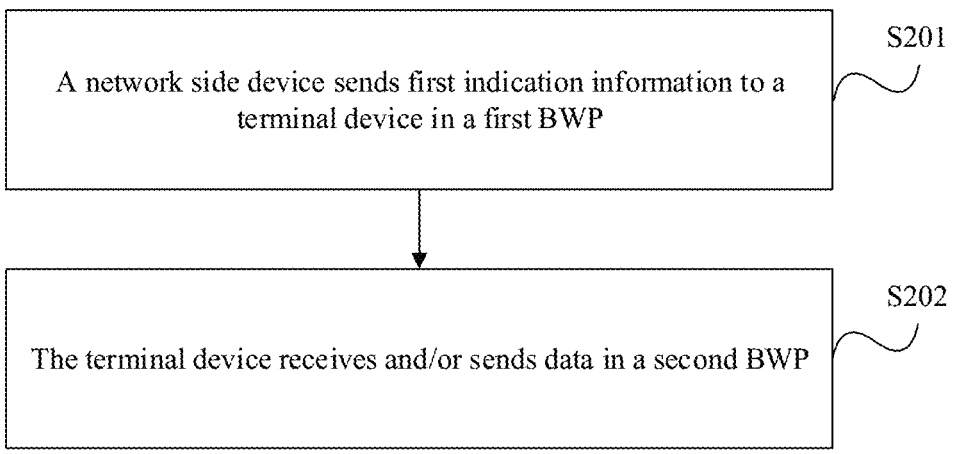
FIG. 2 is a schematic flowchart of an embodiment of a BWP adjustment method according to this application.

FIG. 2 is a schematic flowchart of an embodiment of a BWP adjustment method according to this application. As shown in FIG. 2, the method in this embodiment is as follows:

S201: A network side device sends first indication information to a terminal device in a first BWP.

The first indication information is used to indicate information about a second BWP to be used by the terminal device to receive and/or send data, and is used to indicate the terminal device to enter a sleep state or a wake-up state.

The network side device may determine the second BWP based on a size of a data volume of data to be received and/or sent.

The first BWP may be the same as or different from the second BWP. This is not limited in this application.

The first BWP may be a fixed BWP and specially used to send/receive the first indication information, and is usually a narrowband BWP. In this case, the first BWP is different from the second BWP, and a bandwidth of the second BWP is higher than the bandwidth of the second BWP.

Alternatively, the first BWP may be a BWP that may be used both to receive and/or send data and to send/receive the first indication information. In this case, the first BWP may be the same as or different from the second BWP. This is not limited in this application.

An implementation in which the network side device sends the first indication information to the terminal device in the first BWP includes but is not limited to the following implementations:

In a possible implementation, the network side device sends a go to sleep (GTS) signal to the terminal device in the first BWP, where the GTS signal includes the information about the second BWP.

The GTS is a signal that may be sent to the terminal device when DRX is configured for the terminal device. The signal enables the terminal device to switch from an active state to the sleep state in a DRX cycle and in a serving cell of the terminal device.

In another possible implementation, the network side device sends WUS to the terminal device in the first BWP, where the WUS includes the information about the second BWP.

The WUS is a signal that may be sent to the terminal device when DRX is configured for the terminal device. In a DRX cycle, the terminal device first detects the signal. If the signal is detected, the terminal device is woken up when on duration of the DRX cycle arrives, and enters an active state.

S202: The terminal device receives and/or sends the data in the second BWP.

After receiving the first indication information, the terminal device obtains the second BWP indicated by using the first indication information.

If the second BWP is the same as the first BWP, an operating BWP is not switched, and the data is received and/or sent in the second BWP when the terminal device is in the active state.

If the second BWP is different from the first BWP, an operating BWP is switched from the first BWP to the second BWP, and the data is received and/or sent in the second BWP when the terminal device is in the active state.

In this application, the network side device sends the indication information to the terminal device, to indicate that the operating BWP to be used by the terminal device to receive and/or send the data is the second BWP, so as to dynamically adjust the operating BWP of the terminal device. A BWP for receiving and/or sending data may be determined based on a data volume of data to be actually received and/or sent. Therefore, the operating BWP of the terminal device is more appropriate. In this way, unnecessary overheads and power consumption can be reduced.

Figure 3:
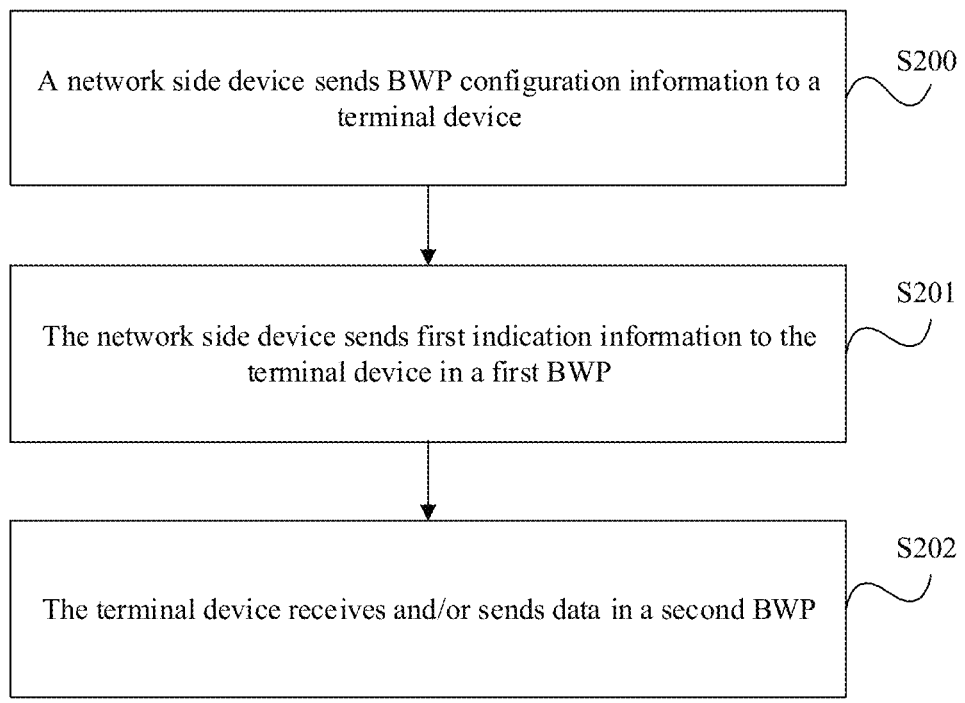
FIG. 3 is a schematic flowchart of another embodiment of a BWP adjustment method according to this application.

FIG. 3 is a schematic flowchart of another embodiment of a BWP adjustment method according to this application. FIG. 3 is based on the embodiment shown in FIG. 2, and optionally, before step S201, the method may further include the following step:

S200: The network side device sends BWP configuration information to the terminal device.

Optionally, the network side device may send RRC signaling to the terminal device, and include the BWP configuration information in the RRC signaling.

In a possible implementation, the BWP configuration information includes configuration information of an active BWP, an initial BWP, and a default BWP.

The second BWP is the active BWP, the initial BWP, or the default BWP.

In another possible implementation, the BWP configuration information includes at least two sets of BWP configuration information, and the at least two sets of BWP configuration information may be customized by a base station.

The second BWP is a BWP corresponding to one of the at least two sets of BWP configuration information that are included in the BWP configuration information.

Optionally, in a possible implementation, same common DRX configuration information is used for all the sets of BWP configuration information. The common DRX configuration information may be agreed upon, and does not need to be configured by the network side device when the network side device configures the BWP configuration information for the terminal device.

In another possible implementation, alternatively, RRC signaling may include DRX configuration information corresponding to the at least two sets of BWP configuration information. The DRX configuration information includes but is not limited to a specific DRX on duration timer, a DRX static timer parameter, a DRX uplink retransmission timer parameter, a DRX downlink retransmission timer parameter, or the like. This is not limited in this application.

Different BWP configuration information may correspond to same or different DRX configuration information. This is not limited in this application.

Optionally, the network side device may further send BWP reconfiguration information to the terminal device, to update the at least two sets of BWP configuration information.

S201: The network side device sends the first indication information to the terminal device in the first BWP.

S202: The terminal device receives and/or sends the data in the second BWP.

For detailed descriptions of steps S201 and S202, refer to the embodiment shown in FIG. 2. Details are not described herein again.

In this application, the network side device sends the BWP configuration information to the terminal device. The network side device may dynamically select a second BWP from the BWP configuration information based on a size of a data volume of data to be actually received and/or sent, and send the first indication information to the terminal device, to indicate the second BWP to be used by the terminal device to receive and/or send the data. Because the operating BWP of the terminal device is more appropriate, unnecessary overheads and power consumption can be reduced.

A GTS signal-based DRX mechanism scenario and a WUS-based DRX mechanism scenario are mainly considered in this application, but this application is not limited to the foregoing two scenarios. The following provides descriptions separately for the two scenarios.

Figure 4:
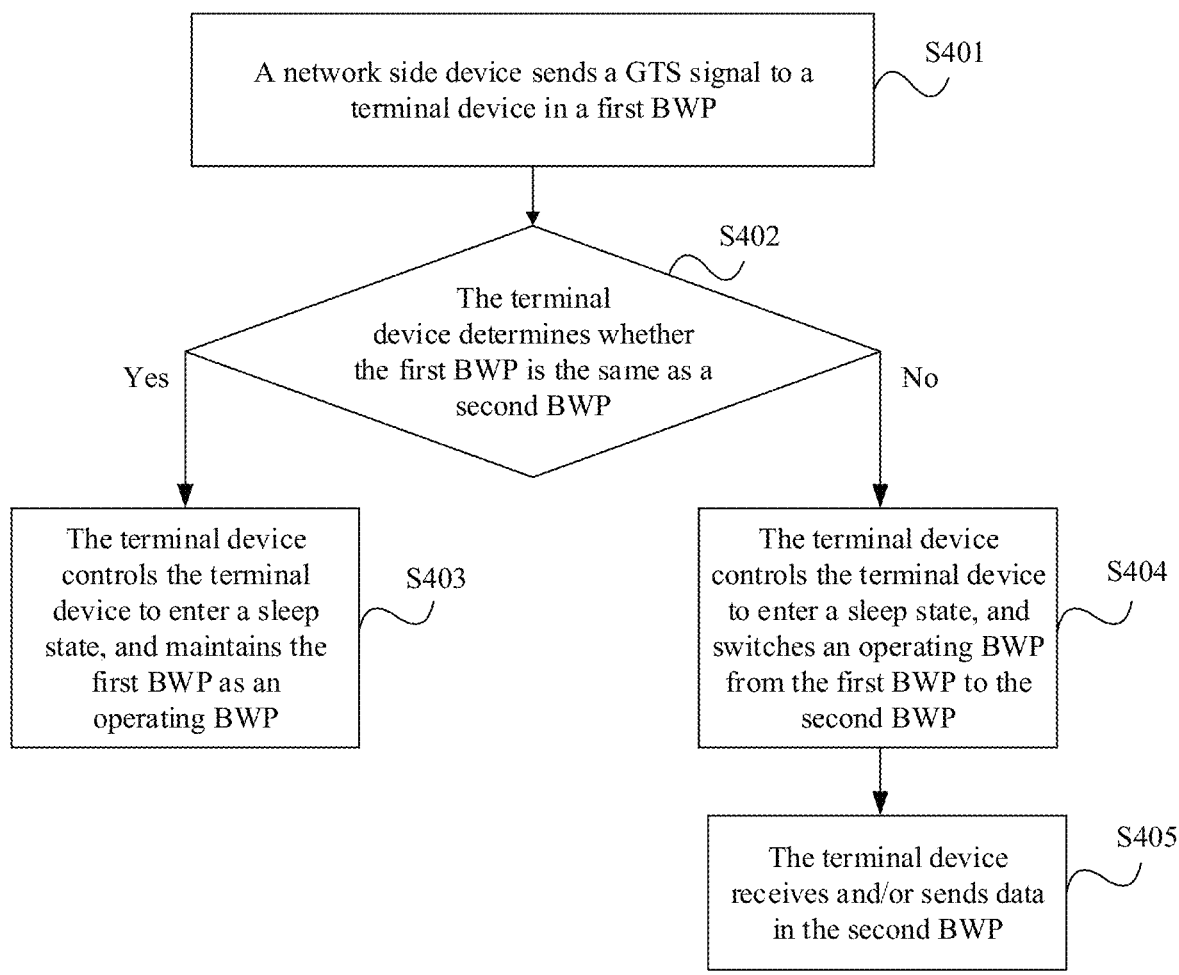
FIG. 4 is a schematic flowchart of still another embodiment of a BWP adjustment method according to this application.
Figure 5:
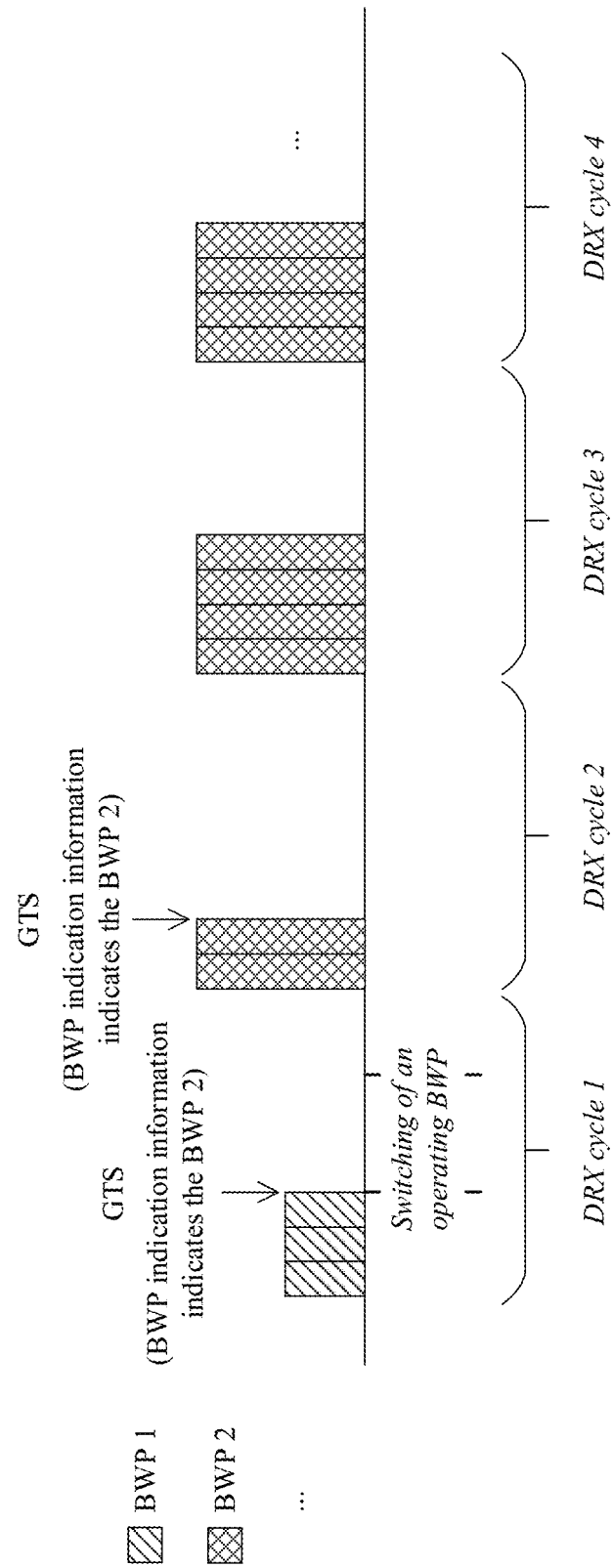
FIG. 5 is a schematic diagram of a GTS signal-based DRX mechanism scenario according to this application.
Figure 6:
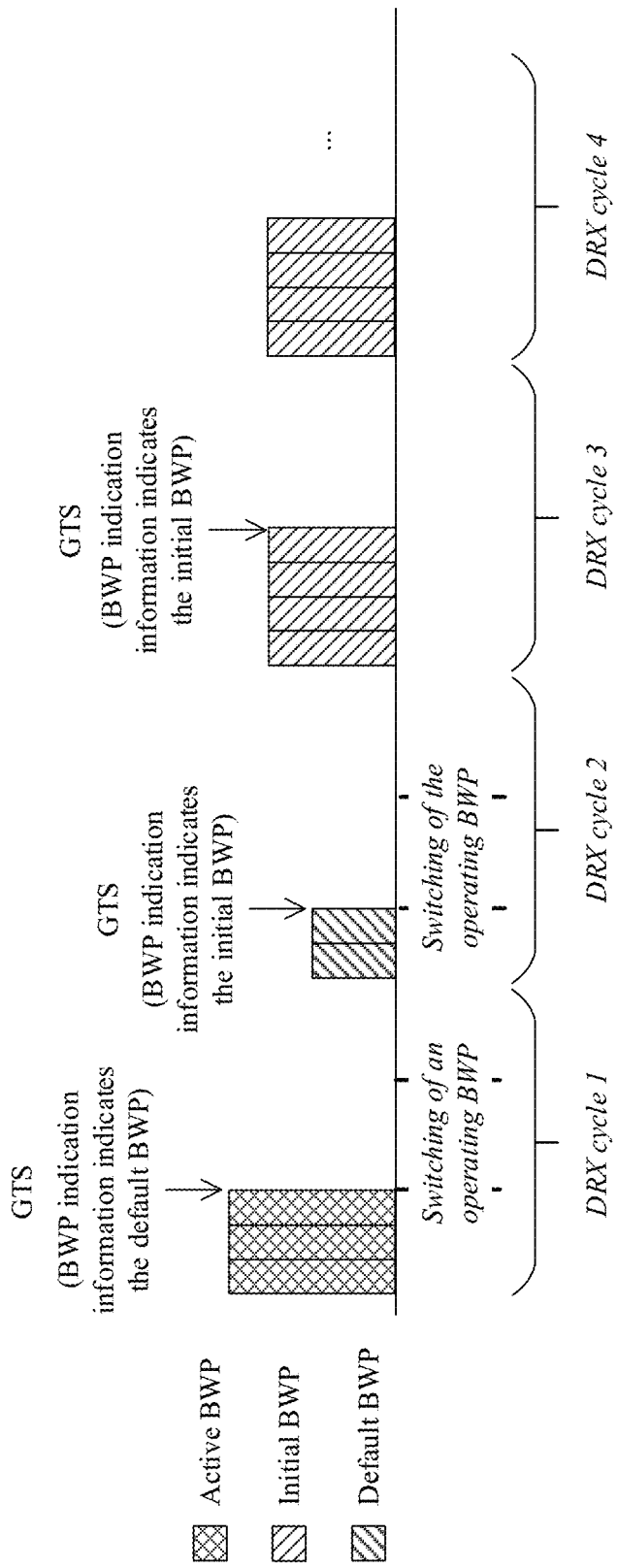
FIG. 6 is a schematic diagram of another GTS signal-based DRX mechanism scenario according to this application.

FIG. 4 to FIG. 6 are for the GTS signal-based DRX mechanism scenario.

FIG. 4 is a schematic flowchart of still another embodiment of a BWP adjustment method according to this application. This embodiment is as follows:

S401: A network side device sends a GTS signal to a terminal device in a first BWP.

The GTS signal includes information about the second BWP.

Optionally, in a possible implementation, the GTS signal is downlink control information DCI, the DCI includes a bandwidth indication field, and the bandwidth indication field is used to indicate the second BWP. After receiving the GTS signal, the terminal device determines, based on the bandwidth indication field, that the second BWP indicated by using the field is an operating BWP for receiving and/or sending data.

In another possible implementation, the GTS signal is a sequence-based signal, and the sequence-based signal corresponds to the second BWP. Different sequence codes correspond to different BWP configuration information. Therefore, after receiving the GTS signal, the terminal device may determine, based on a correspondence between a sequence code of a GTS signal and BWP configuration information, that the second BWP corresponding to a sequence code of the GTS signal is an operating BWP for receiving and/or sending data.

S402: The terminal device determines whether the first BWP is the same as the second BWP.

If the first BWP is the same as the second BWP, perform step S403. If the first BWP is different from the second BWP, perform step S404.

S403: The terminal device controls the terminal device to enter a sleep state, and maintains the first BWP as the operating BWP.

S404: The terminal device controls the terminal device to enter a sleep state, and switches the operating BWP from the first BWP to the second BWP.

Optionally, the terminal device controls the terminal device to enter the sleep state, and switches the operating BWP from the first BWP to the second BWP in the sleep state.

S405: The terminal device receives and/or sends the data in the second BWP.

In this embodiment, the network side device sends the GTS signal to the terminal device in the first BWP. The terminal device determines, depending on whether the first BWP is the same as the second BWP, whether to switch the operating BWP in the sleep state. Because the terminal device switches the operating BWP in the sleep state, the terminal device may send/receive the data in the second BWP immediately after being woken up, and does not need to switch the operating BWP by occupying a time period in which the terminal device is in an active state. In this way, unnecessary power consumption and overheads are further reduced.

The following uses two examples to describe the technical solution shown in FIG. 4. As shown in FIG. 5, FIG. 5 is a schematic diagram of a GTS signal-based DRX mechanism scenario according to this application.

(1) It is assumed that a current DRX cycle is a DRX cycle 1, and the terminal device is in the active state and sends/receives data in a BWP 1. The terminal device receives a GTS signal, where the GTS signal is used to indicate the terminal device to enter the sleep state, and is also used to indicate that an operating BWP for sending/receiving data after the terminal device is woken up next time is a BWP 2.

(2) After receiving the GTS signal, the terminal device first enters the sleep state, and completes BWP switching in the sleep state, that is, switches from the BWP 1 to the BWP 2.

(3) When on duration of a DRX cycle 2 arrives, the terminal device is woken up and enters the active state. In this case, the terminal device operates in the BWP 2.

(4) It is assumed that in the DRX cycle 2, the terminal device receives a GTS signal in the active state, where the GTS signal is used to indicate the terminal device to enter the sleep state, and is also used to indicate that an operating BWP for sending/receiving data after the terminal device is woken up next time is still the BWP 2.

(5) After receiving the GTS signal, the terminal device directly enters the sleep state, and does not need to perform BWP switching subsequently.

(6) When on duration of a DRX cycle 3 arrives, the terminal device is woken up and enters the active state. In this case, the terminal device operates in the BWP 2.

(7) Assuming that in the DRX cycle 3, the terminal device does not receive a GTS signal in the active state, the terminal device directly enters the sleep state after an active time in the DRX cycle expires, and does not need to perform BWP switching subsequently.

(8) When on duration of a DRX cycle 4 arrives, the terminal device is woken up and enters the active state. In this case, the terminal device operates in the BWP 2.

FIG. 6 is a schematic diagram of another GTS signal-based DRX mechanism scenario according to this application. In FIG. 6, the second BWP is an active BWP, an initial BWP, or a default BWP. As shown in FIG. 6:

(1) It is assumed that a current DRX cycle is a DRX cycle 1, and the terminal device is in the active state and sends/receives data in the active BWP. The terminal device receives a GTS signal, where the GTS signal is used to indicate the terminal device to enter the sleep state, and is also used to indicate that an operating BWP for receiving and/or sending data after the terminal device is woken up next time is the default BWP.

(2) After receiving the GTS signal, the terminal device first enters the sleep state, and completes BWP switching in the sleep state, that is, switches from the active BWP to the default BWP.

(3) When on duration of a DRX cycle 2 arrives, the terminal device is woken up and enters the active state. In this case, the terminal device operates in the default BWP.

(4) It is assumed that in the DRX cycle 2, the terminal device receives a GTS signal in the active state, where the GTS signal is used to indicate the terminal device to enter the sleep state, and is also used to indicate that an operating BWP for sending/receiving data after the terminal device is woken up next time is the initial BWP.

(5) After receiving the GTS signal, the terminal device first enters the sleep state, and completes BWP switching in the sleep state, that is, switches from the default BWP to the initial BWP.

(6) When on duration of a DRX cycle 3 arrives, the terminal device is woken up and enters the active state. In this case, the terminal device operates in the initial BWP.

(7) Assuming that in the DRX cycle 3, the terminal device does not receive a GTS signal in the active state, or receives a GTS signal in the active state, where the GTS signal is used to indicate that an operating BWP to be used after the terminal device is woken up next time is still the initial BWP, the terminal device directly enters the sleep state after an active time in the DRX cycle expires, and does not need to perform BWP switching.

(8) When on duration of a DRX cycle 4 arrives, the terminal device is woken up and enters the active state. In this case, the terminal device operates in the initial BWP.

FIG. 7 to FIG. 10 are for the WUS-based DRX mechanism scenario.

Figure 7:
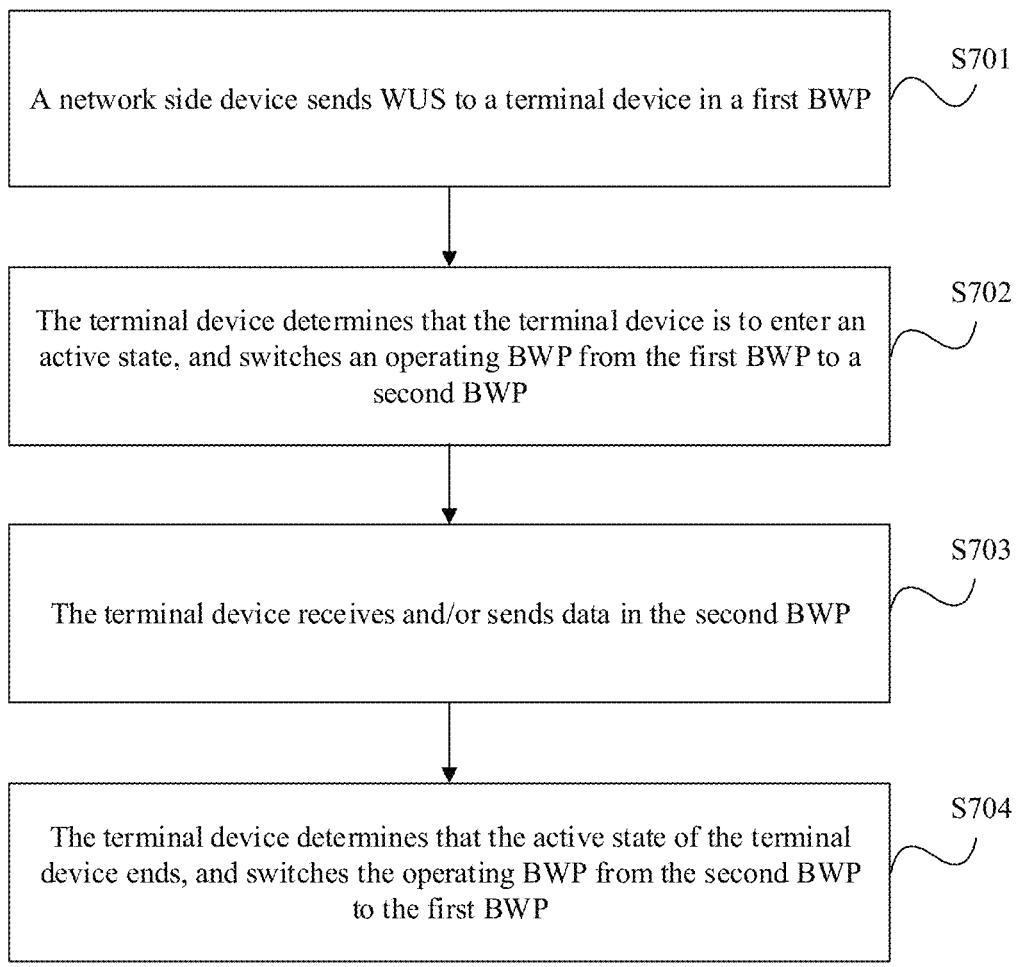
FIG. 7 is a schematic flowchart of yet another embodiment of a BWP adjustment method according to this application.

FIG. 7 is a schematic flowchart of yet another embodiment of a BWP adjustment method according to this application. This embodiment is as follows:

S701: A network side device sends WUS to a terminal device in a first BWP.

The WUS includes information about the second BWP.

The first BWP may be a fixed BWP and specially used to send/receive the WUS, and is usually a narrowband BWP. The second BWP is used to receive and/or send data, and a bandwidth of the second BWP is higher than the bandwidth of the second BWP.

Optionally, in a possible implementation, the WUS is a sequence-based signal, and the sequence-based signal corresponds to the second BWP. Different sequence codes correspond to different BWP configuration information. Therefore, after receiving the WUS, the terminal device may determine, based on a correspondence between a sequence code of WUS and BWP configuration information, that the second BWP corresponding to a sequence code of the WUS is an operating BWP for receiving and/or sending the data.

S702: The terminal device determines that the terminal device is to enter an active state, and switches the operating BWP from the first BWP to the second BWP.

Optionally, the terminal device switches the operating BWP from the first BWP to the second BWP before determining that the terminal device is to enter the active state.

S703: The terminal device receives and/or sends the data in the second BWP.

S704: The terminal device determines that the active state of the terminal device ends, and switches the operating BWP from the second BWP to the first BWP.

Optionally, the terminal device switches the operating BWP from the second BWP to the first BWP after the active state of ends.

In this embodiment, the network side device sends the WUS to the terminal device in the first BWP. The terminal device switches the operating BWP before entering the active state, and switches the operating BWP from the second BWP to the first BWP after the active state ends. In this way, the terminal device may send/receive the data in the second BWP immediately after being woken up, and does not need to switch the operating BWP by occupying a time period in which the terminal device is in the active state. Therefore, unnecessary power consumption and overheads are further reduced.

Figure 8:
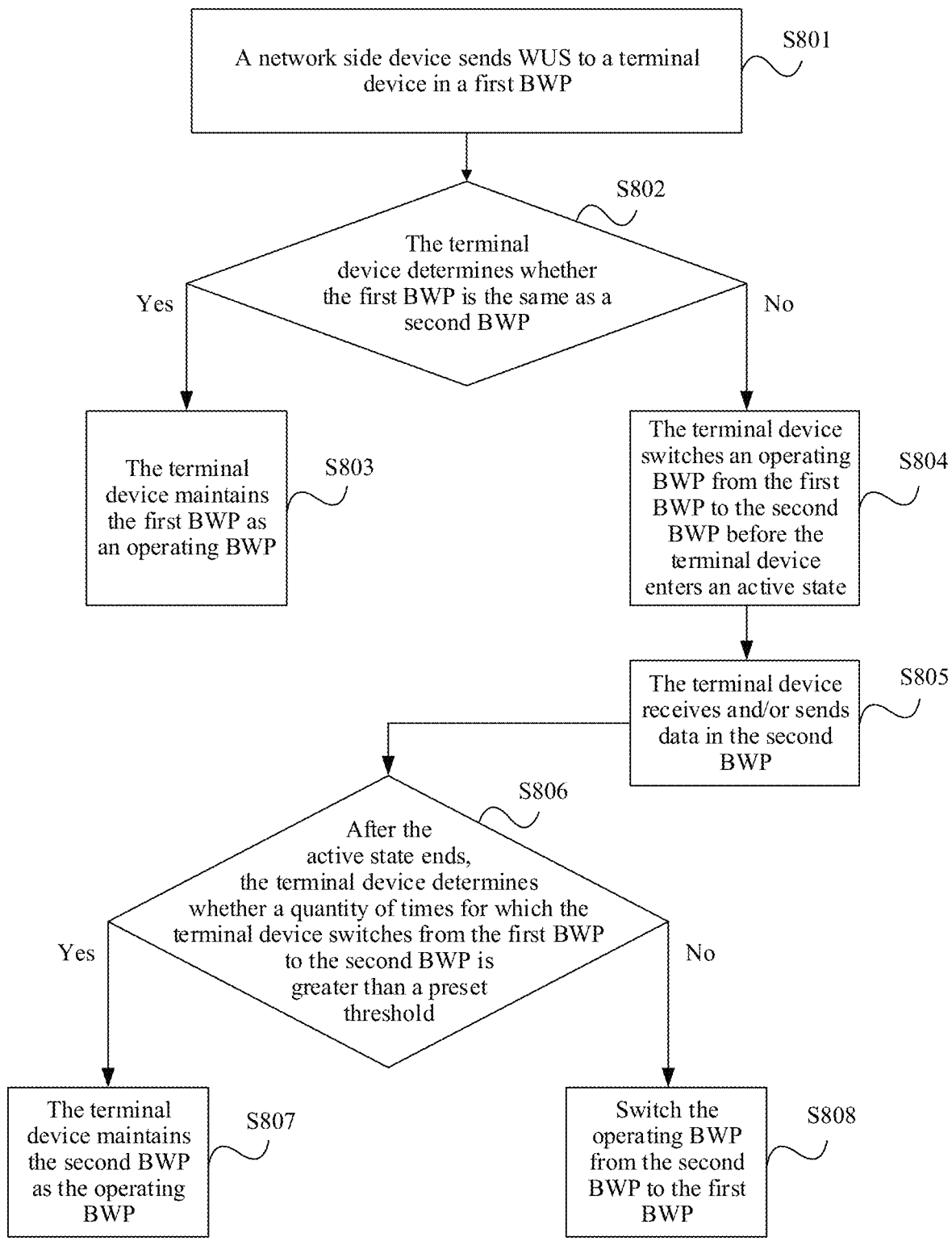
FIG. 8 is a schematic flowchart of yet another embodiment of a BWP adjustment method according to this application.

FIG. 8 is a schematic flowchart of yet another embodiment of a BWP adjustment method according to this application. This embodiment is as follows:

S801: A network side device sends WUS to a terminal device in a first BWP.

The WUS includes information about the second BWP.

The first BWP may be a BWP that may be used both to receive and/or send data and to send/receive first indication information. In this case, the first BWP may be the same as or different from the second BWP. This is not limited in this application.

Optionally, in a possible implementation, the WUS is a sequence-based signal, and the sequence-based signal corresponds to the second BWP. Different sequence codes correspond to different BWP configuration information. Therefore, after receiving the WUS, the terminal device may determine, based on a correspondence between a sequence code of WUS and BWP configuration information, that the second BWP corresponding to a sequence code of the WUS is an operating BWP for receiving and/or sending the data.

S802: The terminal device determines whether the first BWP is the same as the second BWP.

If the first BWP is the same as the second BWP, perform step S803. If the first BWP is different from the second BWP, perform step S804.

S803: The terminal device maintains the first BWP as the operating BWP.

S804: The terminal device switches the operating BWP from the first BWP to the second BWP before the terminal device enters an active state.

S805: The terminal device receives and/or sends the data in the second BWP.

S806: After the active state ends, the terminal device determines whether a quantity of times for which the terminal device switches from the first BWP to the second BWP is greater than a preset threshold. If yes, perform step S807. If no, perform step S808.

S807: The terminal device maintains the second BWP as the operating BWP.

S808: Switch the operating BWP from the second BWP to the first BWP.

In this embodiment, the network side device sends the WUS to the terminal device in the first BWP. The terminal device determines, depending on whether the first BWP is the same as the second BWP, whether to switch the operating BWP before entering the active state. Because the terminal device switches the operating BWP before entering the active state, the terminal device may send/receive the data in the second BWP immediately after being woken up, and does not need to switch the operating BWP by occupying a time period in which the terminal device is in the active state. In this way, unnecessary power consumption and overheads are further reduced. In addition, if the quantity of times for which the terminal device switches from the first BWP to the second BWP is greater than the preset threshold, the terminal device maintains the second BWP as the operating BWP after the active state of the terminal device ends. Therefore, a quantity of BWP switching times is reduced, and the power consumption and overheads are further reduced.

The following uses two examples to describe the solution shown in FIG. 7.

Figure 9:
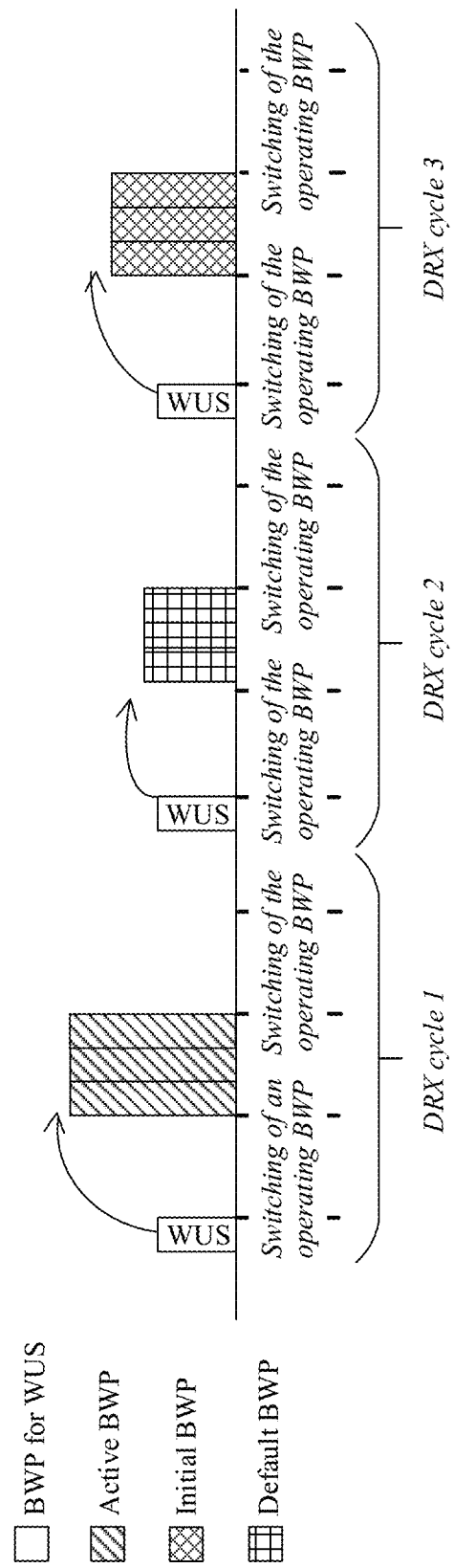
FIG. 9 is a schematic diagram of a WUS-based DRX mechanism scenario according to this application.

FIG. 9 is a schematic diagram of a WUS-based DRX mechanism scenario according to this application. As shown in FIG. 9:

(1) The terminal device receives WUS in a narrowband BWP, where the narrowband BWP is lower than a default BWP.

(2) It is assumed that a current DRX cycle is a DRX cycle 1, the terminal device detects WUS in the narrowband BWP, and the WUS is used to indicate that an operating BWP to be used after the terminal device is woken up in the DRX cycle is an active BWP.

(3) In the DRX cycle 1, the terminal device completes switching of the operating BWP before on duration arrives, that is, switches from the narrowband BWP for receiving the WUS to the active BWP. When the on duration arrives, the terminal device enters the active state.

(4) After an active time of the terminal device in the DRX cycle 1 expires, the terminal device enters a sleep state, and then completes switching of the operating BWP, to switch from the operating active BWP to the narrowband BWP for receiving the WUS.

(5) It is assumed that the terminal device detects WUS in the narrowband BWP in a DRX cycle 2, and the WUS is used to indicate that an operating BWP to be used after the terminal device is woken up in the DRX cycle is the default BWP.

(6) In the DRX cycle 2, the terminal device completes switching of the operating BWP before on duration arrives, that is, switches from the narrowband BWP for receiving the WUS to the default BWP. When the on duration arrives, the terminal device enters the active state.

(7) After an active time of the terminal device in the DRX cycle 2 expires, the terminal device enters the sleep state, and then completes switching of the operating BWP, to switch from the operating default BWP to the narrowband BWP for receiving the WUS.

(8) Operations in each subsequent DRX cycle are as described above.

(9) If the terminal device does not detect WUS in a DRX cycle, the terminal device is not woken up and does not enter the active state in the DRX cycle, but remains in the sleep state.

Figure 10:
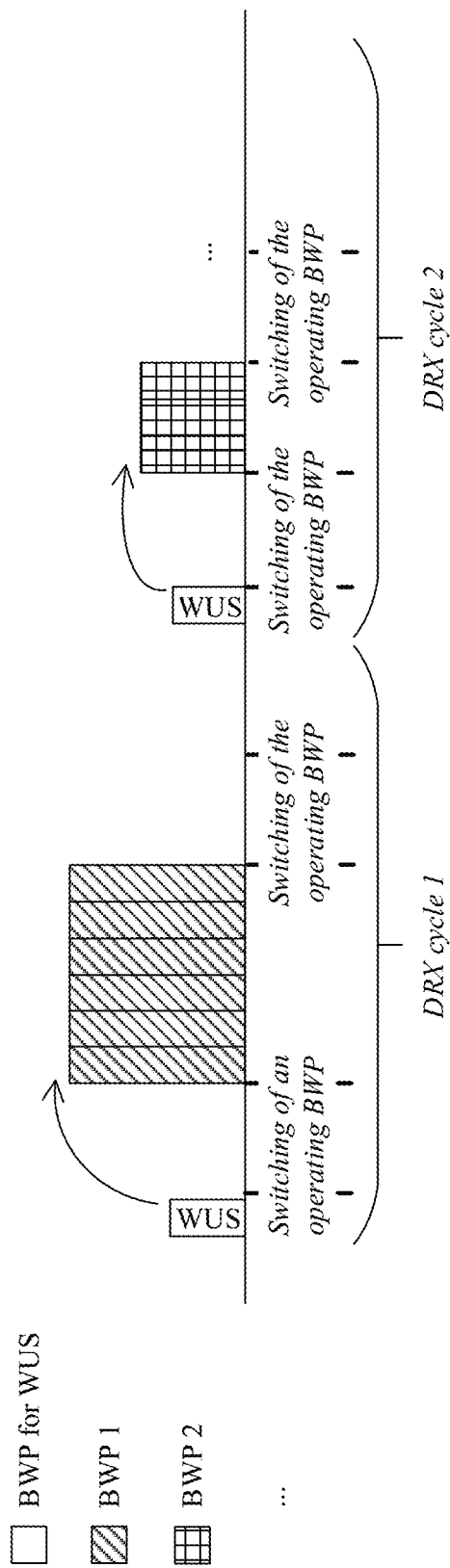
FIG. 10 is a schematic diagram of another WUS-based DRX mechanism scenario according to this application.

FIG. 10 is a schematic diagram of another WUS-based DRX mechanism scenario according to this application. As shown in FIG. 10:

(1) WUS is sent in a narrowband BWP.

(2) It is assumed that a current DRX cycle is a DRX cycle 1, the terminal device detects WUS in the narrowband BWP, and the WUS is used to indicate that an operating BWP to be used after the terminal device is woken up in the DRX cycle is a BWP 1.

(3) In the DRX cycle 1, the terminal device completes switching of the operating BWP before on duration arrives, that is, switches from the narrowband BWP for receiving the WUS to the BWP 1. Then, when the on duration arrives, the terminal device enters the active state.

(4) After an active time of the terminal device in the DRX cycle 1 expires, the terminal device enters a sleep state, and then completes switching of the operating BWP, to switch from the operating BWP 1 to the narrowband BWP for receiving the WUS.

(5) It is assumed that the terminal device detects WUS in the narrowband BWP in a DRX cycle 2, and the WUS is used to indicate that an operating BWP to be used after the terminal device is woken up in the DRX cycle is a BWP 2.

(6) In the DRX cycle 2, the terminal device first completes BWP switching before on duration arrives, that is, switches from the narrowband BWP for receiving the WUS to the BWP 2. Then, when the on duration arrives, the terminal device enters the active state.

(7) After an active time of the terminal device in the DRX cycle 2 expires, the terminal device enters the sleep state, and then completes switching of the operating BWP, to switch from the operating BWP 2 to the narrowband BWP for receiving the WUS.

(8) Operations in each subsequent DRX cycle are as described above.

(9) If the terminal device does not detect WUS in a DRX cycle, the terminal device is not woken up and does not enter the active state in the DRX cycle, but remains in the sleep state.

Figure 11:
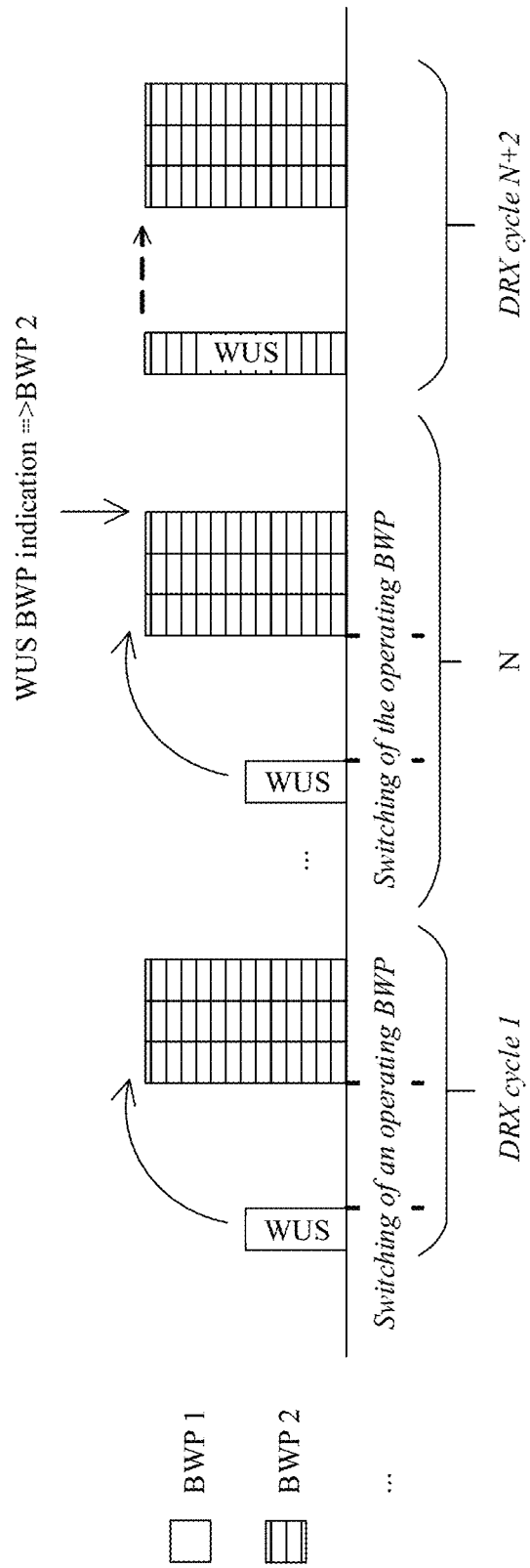
FIG. 11 is a schematic diagram of still another WUS-based DRX mechanism scenario according to this application.

The following uses an example to describe the solution shown in FIG. 8. As shown in FIG. 11, FIG. 11 is a schematic diagram of still another WUS-based DRX mechanism scenario according to this application.

(1) It is assumed that a current DRX cycle is a DRX cycle 1, and the terminal device receives WUS in a BWP 1.

(2) The terminal device detects WUS in the BWP 1 in the DRX cycle 1, and the WUS is used to indicate that an operating BWP to be used after the terminal device is woken up in the DRX cycle is a BWP 2.

(3) In the DRX cycle 1, the terminal device first completes switching of the operating BWP before on duration arrives, that is, switches from the BWP 1 for receiving the WUS to the BWP 2. Then, when the on duration arrives, the terminal device enters the active state.

(4) After an active time of the terminal device in the DRX cycle 1 expires, the terminal device enters a sleep state, and then completes switching of the operating BWP, to switch from the operating BWP 2 to the BWP 1 for the WUS.

(5) It is assumed that the terminal device detects WUS in the BWP 1 in N subsequent DRX cycles, and all the WUS is used to indicate that operating BWPs to be used after the terminal device is woken up in the DRX cycles are the BWP 2. To be specific, the terminal device switches from the BWP 1 for the WUS to the BWP 2 in several DRX cycles to send/receive data, and the BWP for receiving the WUS is inconsistent with the BWP for sending/receiving the data. In this case, the BWP for receiving the WUS is also switched from the original BWP 1 to the BWP 2.

(6) In a next DRX cycle, namely, a DRX cycle N+2, the terminal device detects WUS in the BWP 2.

(7) If the terminal device does not detect WUS in a DRX cycle, the terminal device is not woken up and does not enter the active state in the DRX cycle, but remains in the sleep state. The current BWP for the WUS is not changed.

This application further provides an embodiment of a method for determining a monitoring time of WUS. A monitoring time of WUS is determined based on a start moment of an on duration timer, so that a range of the monitoring time of the WUS is smaller and more effective, so as to further reduce power consumption and overheads.

FIG. 12 to FIG. 16 are schematic diagrams showing embodiments of determining a monitoring time of WUS.

Figure 12:
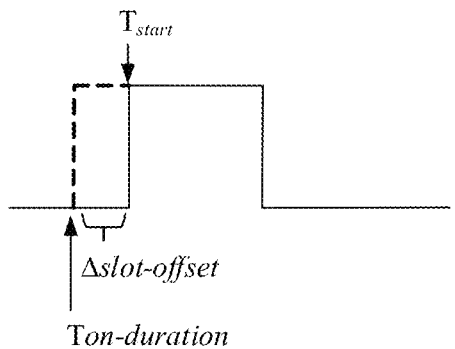
FIG. 12 to FIG. 16 are schematic diagrams showing technical solutions to determining an actual sending moment or sending time of WUS.

FIG. 12 shows a DRX mechanism in a conventional technology. $T_{on\text{-}duration}$ is an on duration start point obtained by using an on duration start point-related calculation formula in an existing DRX mechanism. $\Delta_{slot\text{-}offset}$ is a slot offset (Slot Offset) indicated by a DRX slot offset parameter (drx-SlotOffset) in DRX. In this case, a start moment of a DRX on duration timer is represented as $T_{start}=T_{on\text{-}duration}+\Delta_{slot\text{-}offset}$.

It is assumed that an offset between a monitoring moment $T_{WUS}$ of WUS and the start moment $T_{start}$ of the DRX on duration timer is $\Delta_{WUS\text{-}offset}$, and the terminal device determines, based on the offset, the moment or a time period of monitoring the WUS.

The monitoring time of the WUS includes but is not limited to the following several possible cases:

In a possible implementation, the monitoring time of the WUS is determined based on the start moment of the on duration timer and a first offset.

The first offset is an offset between a sending moment of the WUS and the start moment of the on duration timer.

Specifically, the start moment of the on duration timer is determined according to $T_{start}=T_{on\text{-}duration}+\Delta_{slot\_offset}$.

Figure 13:
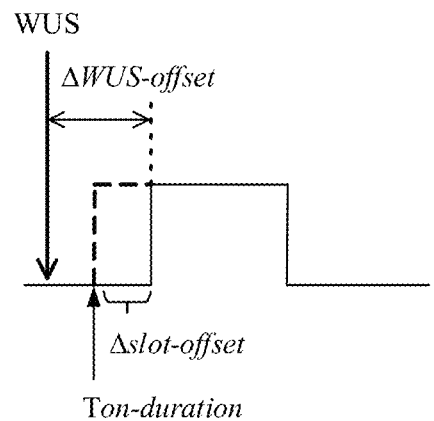
Figure 14:
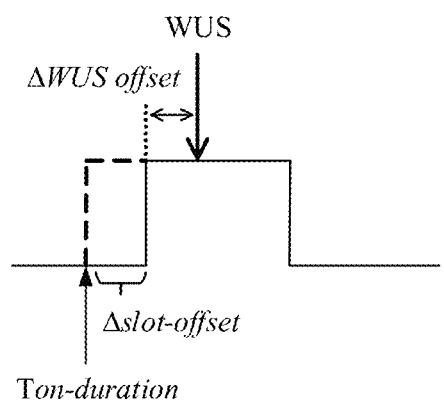

The monitoring time of the WUS is determined according to $T_{WUS}=T_{start}\pm\Delta_{WUS\text{-}offset}$ As shown in FIG. 13 and FIG. 14, $T_{WUS}$ is a reference point of the monitoring time of the WUS, $T_{start}$ is the start moment of the on duration timer, and $\Delta_{WUS\text{-}offset}$ is the first offset. The monitoring time of the WUS is the moment $T_{WUS}$ or a time period including the moment $T_{WUS}$, and the time period including the moment $T_{WUS}$ may be a time period starting from $T_{WUS}$, or may be a time period starting from a moment that is before $T_{WUS}$ and ending at a moment that is after $T_{WUS}$.

In another possible implementation, the monitoring time of the WUS is determined based on a start moment of on duration, a second offset, and the first offset, where the second offset is a slot offset of discontinuous reception DRX.

Specifically, the monitoring time of the WUS is determined according to $T_{WUS}=T_{on\text{-}duration}+\Delta_{slot\_offset}\pm\Delta_{WUS\text{-}offset}$. As shown in FIG. 13 and FIG. 14:

$T_{WUS}$ is a reference point of the monitoring time of the WUS, $T_{on\text{-}duration}$ is the start moment of the on duration, $\Delta_{slot\_offset}$ is the second offset, and $\Delta_{WUS\text{-}offset}$ is the first offset. The monitoring time of the WUS is the moment $T_{WUS}$ or a time period including the moment $T_{WUS}$, and the time period including the moment $T_{WUS}$ may be a time period starting from $T_{WUS}$, or may be a time period starting from a moment that is before $T_{WUS}$ and ending at a moment that is after $T_{WUS}$.

In still another possible implementation, the start moment of the on duration timer is determined as the monitoring time of the WUS.

Figure 15:
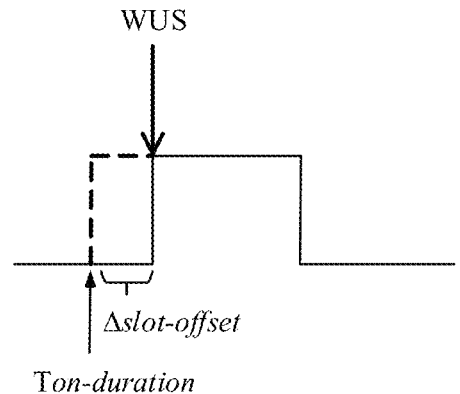

That is, $T_{WUS}=T_{start}$. As shown in FIG. 15, $T_{WUS}$ is a reference point of the monitoring WUS start time of the WUS, and $T_{start}$ is the start moment of the on duration timer. The monitoring time of the WUS is the moment $T_{WUS}$ or a time period including the moment $T_{WUS}$, and the time period including the moment $T_{WUS}$ may be a time period starting from $T_{WUS}$, or may be a time period starting from a moment that is before $T_{WUS}$ and ending at a moment that is after $T_{WUS}$.

The start moment of the on duration timer may be determined based on a start moment of on duration and a second offset. Specifically, the start moment of the on duration timer is determined according to $T_{start}=T_{on\text{-}duration}+\Delta_{slot\_offset}$.

In yet another possible implementation, the monitoring time of the WUS is determined based on a start moment of on duration and a second offset. Specifically, the monitoring time of the WUS is determined according to $T_{WUS}=T_{on\text{-}duration}+\Delta_{slot\_offset}$. As shown in FIG. 15, the monitoring time of the WUS is the moment $T_{WUS}$ or a time period including the moment $T_{WUS}$, and the time period including the moment $T_{WUS}$ may be a time period starting from $T_{WUS}$, or may be a time period starting from a moment that is before $T_{WUS}$ and ending at a moment that is after $T_{WUS}$.

Figure 16:
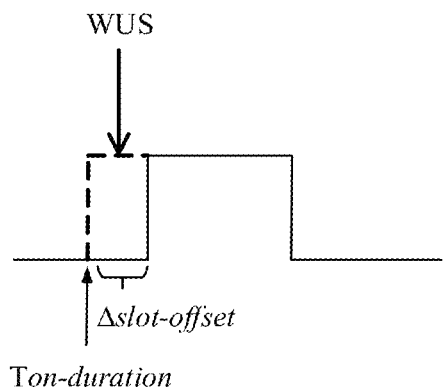

In yet another possible implementation, the start moment of the on duration timer is determined based on a start moment of on duration and a second offset, and a time period from the start moment of the on duration to the start moment of the on duration timer is determined as the monitoring time of the WUS. As shown in FIG. 16, a time period corresponding to $\Delta_{slot\_offset}$ is the monitoring time of the WUS.

In yet another possible implementation, the start moment of the on duration timer is determined based on a start moment of on duration and a second offset, and a time period that corresponds to the second offset and that is before the start moment of the on duration timer is determined as the monitoring time of the WUS. As shown in FIG. 16, a time period corresponding to $\Delta_{slot\_offset}$ is the monitoring time of the WUS.

In yet another possible implementation, a time period that corresponds to a second offset and that is after a start moment of on duration is determined as the monitoring time of the WUS. As shown in FIG. 16, a time period corresponding to $\Delta_{slot\_offset}$ is the monitoring time of the WUS.

Figure 17:
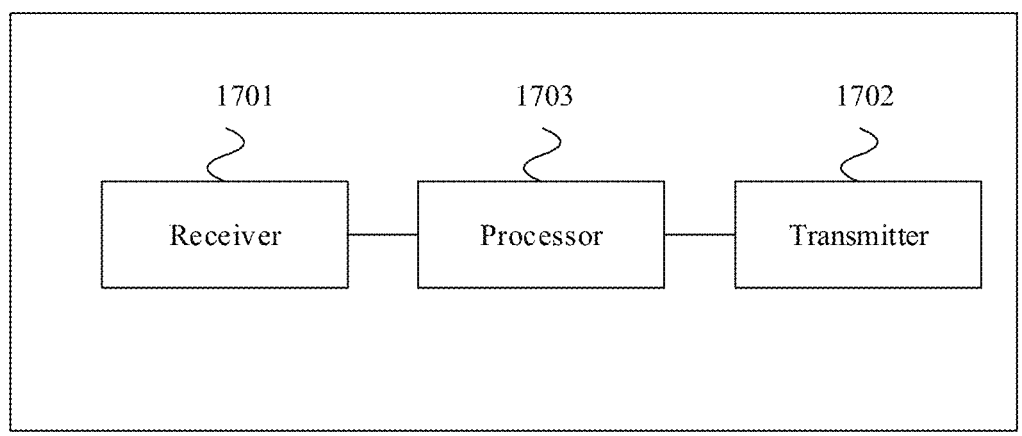
FIG. 17 is a schematic structural diagram of an embodiment of a bandwidth part BWP adjustment apparatus according to this application.

FIG. 17 is a schematic structural diagram of an embodiment of a bandwidth part BWP adjustment apparatus according to this application. The apparatus in this embodiment includes a receiver 1701 and a transmitter 1702. The receiver 1701 is configured to receive, in a first BWP, first indication information sent by a network side device, where the first indication information is used to indicate information about a second BWP to be used by a terminal device to receive and/or send data, and is used to indicate the terminal device to enter a sleep state or a wake-up state.

The receiver 1701 is further configured to receive the data in the second BWP, and/or the transmitter 1702 is configured to send the data in the second BWP.

Optionally, the first indication information is a go to sleep GTS signal, and the GTS signal includes the information about the second BWP.

Optionally, if the first BWP is different from the second BWP, the apparatus further includes:

a processor 1703, configured to control the terminal device to enter the sleep state, and switch an operating BWP from the first BWP to the second BWP.

Optionally, the processor 1703 is specifically configured to control the terminal device to enter the sleep state, and switch the operating BWP from the first BWP to the second BWP in the sleep state.

Optionally, the GTS signal is downlink control information DCI, the DCI includes a bandwidth indication field, and the bandwidth indication field is used to indicate the information about the second BWP.

Optionally, the GTS signal is a sequence-based signal, and the sequence-based signal corresponds to the second BWP.

Optionally, the first indication information is wake up signaling WUS, and the WUS includes the information about the second BWP.

Optionally, if the first BWP is different from the second BWP, the apparatus further includes:

a processor 1703, configured to: determine that the terminal device is to enter an active state, and switch an operating BWP from the first BWP to the second BWP; and determine that the active state of the terminal device ends, and switch the operating BWP from the second BWP to the first BWP.

Optionally, the processor 1703 is specifically configured to switch the operating BWP from the first BWP to the second BWP before the terminal device enters the active state, and switch the operating BWP from the second BWP to the first BWP after the active state of the terminal device ends.

Optionally, the processor 1703 is further configured to: if a quantity of times for which the terminal device switches from the first BWP to the second BWP is greater than a preset threshold, maintain, by the terminal device, the second BWP as the operating BWP after the active state of the terminal device ends.

Optionally, the WUS is a sequence-based signal, and the sequence-based signal corresponds to the second BWP.

Optionally, the receiver 1701 is further configured to receive BWP configuration information sent by the network side device, where the BWP configuration information includes configuration information of an active BWP, an initial BWP, and a default BWP, and the second BWP is the active BWP, the initial BWP, or the default BWP.

Optionally, the receiver 1701 is further configured to receive BWP configuration information sent by the network side device, where the BWP configuration information includes at least two sets of BWP configuration information, and the second BWP is a BWP corresponding to one of the at least two sets of BWP configuration information.

Optionally, the receiver 1701 is further configured to receive radio resource control RRC signaling sent by the network side device, where the RRC signaling includes the BWP configuration information.

Optionally, the RRC signaling further includes DRX configuration information respectively corresponding to the at least two sets of BWP configuration information.

Optionally, the receiver 1701 is further configured to receive BWP reconfiguration information sent by the network side device. The processor 1703 is further configured to update the at least two sets of BWP configuration information based on the BWP reconfiguration information.

Optionally, the processor 1703 is further configured to obtain a sending time of the WUS.

The transmitter 1702 is further configured to receive, in the first BWP and at the sending time of the WUS, the wake up signaling WUS sent by the network side device.

The apparatus in this embodiment may be correspondingly configured to perform steps performed by the terminal device in the method embodiment shown in any one of FIG. 1 to FIG. 11. Implementation principles and technical effects of the apparatus are similar to those in the method embodiment, and details are not described herein again.

Figure 18:
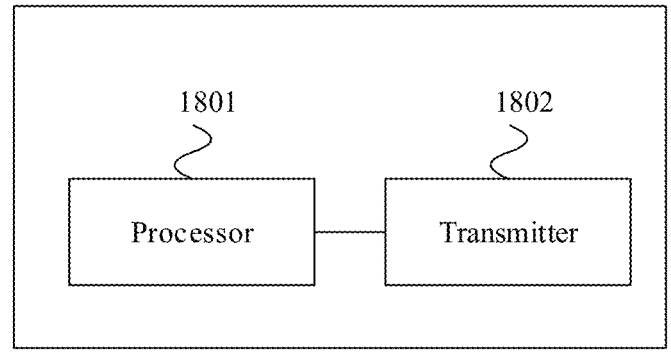
FIG. 18 is a schematic structural diagram of another embodiment of a bandwidth part BWP adjustment apparatus according to this application.

FIG. 18 is a schematic structural diagram of another embodiment of a bandwidth part BWP adjustment apparatus according to this application. The apparatus in this embodiment includes a processor 1801 and a transmitter 1802. The processor 1801 is configured to determine a second BWP based on data to be received and/or sent by a terminal device. The transmitter is configured to send first indication information to the terminal device in a first BWP, where the first indication information is used to indicate information about the second BWP to be used by the terminal device to receive and/or send the data, and is used to indicate the terminal device to enter a sleep state or a wake-up state.

Optionally, the first indication information is a go to sleep GTS signal, and the GTS signal includes the information about the second BWP.

Optionally, the GTS signal is downlink control information DCI, the DCI includes a bandwidth indication field, and the bandwidth indication field is used to indicate the information about the second BWP.

Optionally, the GTS signal is a sequence-based signal, and the sequence-based signal corresponds to the second BWP.

Optionally, the first indication information is wake up signaling WUS, and the WUS includes the information about the second BWP.

Optionally, the WUS is a sequence-based signal, and the sequence-based signal corresponds to the second BWP.

Optionally, the transmitter 1802 is further configured to send BWP configuration information to the terminal device, where the BWP configuration information includes configuration information of an active BWP, an initial BWP, and a default BWP, and the second BWP is the active BWP, the initial BWP, or the default BWP.

Optionally, the transmitter 1802 is further configured to send BWP configuration information to the terminal device, where the BWP configuration information includes at least two sets of BWP configuration information, and the second BWP is a BWP corresponding to one of the at least two sets of BWP configuration information.

Optionally, the transmitter 1802 is specifically configured to send radio resource control RRC signaling to the terminal device, where the RRC signaling includes the BWP configuration information.

Optionally, the RRC signaling further includes DRX configuration information corresponding to the at least two sets of BWP configuration information.

The apparatus in this embodiment may be correspondingly configured to perform steps performed by the network device in the method embodiment shown in any one of FIG. 1 to FIG. 11. Implementation principles and technical effects of the apparatus are similar to those in the method embodiment, and details are not described herein again.

Figure 19:
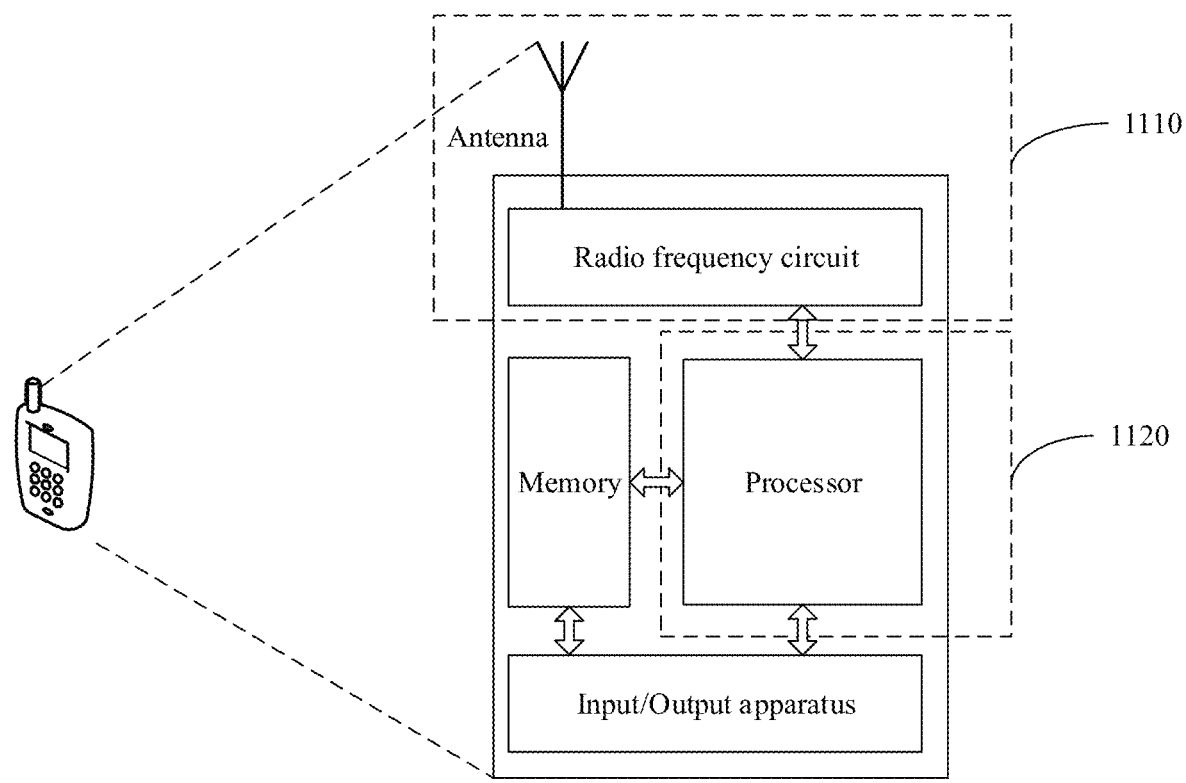
FIG. 19 is a schematic block diagram of a BWP adjustment apparatus according to an embodiment of this application.

This application further provides a schematic structural diagram of an embodiment of an apparatus for determining a monitoring time of wake up signaling WUS. As shown in FIG. 19, a processor is configured to obtain a start moment of an on duration timer, and the processor is further configured to determine a monitoring time of the WUS based on the start moment of the on duration timer.

Optionally, the processor is specifically configured to determine the monitoring time of the WUS based on the start moment of the on duration timer and a first offset, where the first offset is an offset between a sending moment of the WUS and the start moment of the on duration timer.

Optionally, the processor is specifically configured to determine the monitoring time of the WUS based on a start moment of on duration, a second offset, and the first offset, where the second offset is a slot offset of discontinuous reception DRX.

Optionally, the processor is specifically configured to:
determine the monitoring time of the WUS according to $T_{WUS} = T_{on\text{-}duration} + \Delta_{slot\text{-}offset} \pm \Delta_{WUS\text{-}offset}$, where
$T_{WUS}$ is a reference point of the monitoring time of the WUS, $T_{on\text{-}duration}$ is the start moment of the on duration, $\Delta_{slot\text{-}offset}$ is the second offset, $\Delta_{WUS\text{-}offset}$ is the first offset, and the monitoring time of the WUS is the moment $T_{WUS}$ or a time period including the moment $T_{WUS}$.

Optionally, the processor is specifically configured to determine the start moment of the on duration timer as the monitoring time of the WUS.

Optionally, the processor is further configured to determine the start moment of the on duration timer based on a start moment of on duration and a second offset.

Optionally, the processor is specifically configured to determine the start moment of the on duration timer according to $T_{start} = T_{on\text{-}duration} + \Delta_{slot\text{-}offset}$, where
$T_{on\text{-}duration}$ is the start moment of the on duration, $\Delta_{slot\text{-}offset}$ is the second offset, and $T_{start}$ is the start moment of the on duration timer.

Optionally, the processor is specifically configured to determine the monitoring time of the WUS based on a start moment of on duration and a second offset.

Optionally, the processor is specifically configured to determine the monitoring time of the WUS according to $T_{WUS} = T_{on\text{-}duration} + \Delta_{slot\text{-}offset}$, where
$T_{on\text{-}duration}$ is the start moment of the on duration, $\Delta_{slot\text{-}offset}$ is the second offset, $T_{WUS}$ is a reference point of the monitoring time of the WUS, and the monitoring time of the WUS is the moment $T_{WUS}$ or a time period including the moment $T_{WUS}$.

Optionally, the processor is specifically configured to: determine the start moment of the on duration timer based on a start moment of on duration and a second offset; and determine a time period from the start moment of the on duration to the start moment of the on duration timer as the monitoring time of the WUS.

Optionally, the processor is specifically configured to: determine the start moment of the on duration timer based on a start moment of on duration and a second offset; and determine, as the monitoring time of the WUS, a time period that corresponds to the second offset that is before the start moment of the on duration timer.

Optionally, the processor is specifically configured to determine, as the monitoring time of the WUS, a time period that corresponds to a second offset and that is after a start moment of on duration.

The apparatus in this embodiment may be correspondingly configured to perform steps performed by the terminal device in the method embodiment shown in any one of FIG. 12 to FIG. 16. Implementation principles and technical effects of the apparatus are similar to those in the method embodiment, and details are not described herein again.

This application further provides a computer-readable storage medium, storing a computer program. When the program is executed by a processor, the bandwidth part BWP adjustment method shown in any one of FIG. 1 to FIG. 11 is implemented.

This application further provides a computer-readable storage medium, storing a computer program. When the program is executed by a processor, the bandwidth part BWP adjustment method shown in any one of FIG. 1 to FIG. 11 is implemented.

This application further provides a computer-readable storage medium, storing a computer program. When the program is executed by a processor, the bandwidth part BWP adjustment method shown in any one of FIG. 1 to FIG. 11 is implemented.

This application further provides a bandwidth part BWP adjustment apparatus, including a memory, a processor, and a program that is stored in the memory and that can run on the processor. When the processor executes the program, the bandwidth part BWP adjustment method shown in any one of FIG. 1 to FIG. 11 is implemented.

This application further provides a bandwidth part BWP adjustment apparatus, including a memory, a processor, and a program that is stored in the memory and that can run on the processor. When the processor executes the program, the bandwidth part BWP adjustment method shown in any one of FIG. 1 to FIG. 11 is implemented.

This application further provides an apparatus for determining a monitoring time of wake up signaling WUS, including a memory, a processor, and a program that is stored in the memory and that can run on the processor. When the processor executes the program, the bandwidth part BWP adjustment method shown in any one of FIG. 1 to FIG. 11 is implemented.

An embodiment of this application further provides a communication apparatus, and the communication apparatus may be a terminal device or a circuit. The communication apparatus may be configured to perform an action performed by the terminal device in the foregoing method embodiments.

When a BWP adjustment apparatus is a terminal device, FIG. 19 is a simplified schematic structural diagram of a terminal device. For ease of understanding and illustration, an example in which the terminal device is a mobile phone is used in FIG. 19. As shown in FIG. 19, the terminal device includes a processor, a memory, a radio frequency circuit, an antenna, and an input/output apparatus. The processor is mainly configured to: process a communication protocol and communication data, control the terminal device, execute a software program, process data of the software program, and so on. The memory is mainly configured to store the software program and the data. The radio frequency circuit is mainly configured to: perform conversion between a baseband signal and a radio frequency signal, and process the radio frequency signal. The antenna is mainly configured to send and receive the radio frequency signal in an electromagnetic wave form. The input/output apparatus such as a touchscreen, a display, or a keyboard is mainly configured to receive data entered by a user and output data to the user. It should be noted that some types of terminal devices may have no input/output apparatus.

When data needs to be sent, the processor performs baseband processing on the to-be-sent data, and outputs a baseband signal to the radio frequency circuit. After performing radio frequency processing on the baseband signal, the radio frequency circuit sends a radio frequency signal in the electromagnetic wave form through the antenna. When data is sent to the terminal device, the radio frequency circuit receives a radio frequency signal through the antenna, converts the radio frequency signal into a baseband signal, and outputs the baseband signal to the processor. The processor converts the baseband signal into data, and processes the data. For ease of description, FIG. 19 shows only one memory and one processor. In an actual terminal device product, there may be one or more processors and one or more memories. The memory may also be referred to as a storage medium, a storage device, or the like. The memory may be disposed independent of the processor, or may be integrated into the processor. This is not limited in this embodiment of this application.

In this embodiment of this application, the antenna and the radio frequency circuit that have sending and receiving functions may be considered as a transceiver unit of the terminal device, and the processor that has a processing function may be considered as a processing unit of the terminal device. As shown in FIG. 19, the terminal device includes a transceiver unit 1110 and a processing unit 1120. The transceiver unit may also be referred to as a transceiver, a transceiver, a transceiver apparatus, or the like. The processing unit may also be referred to as a processor, a processing board, a processing module, a processing apparatus, or the like. Optionally, a component for implementing the receiving function in the transceiver unit 1110 may be considered as a receiving unit, and a component for implementing the sending function in the transceiver unit 1110 may be considered as a sending unit. In other words, the transceiver unit 1110 includes the receiving unit and the sending unit. The transceiver unit may also be sometimes referred to as a transceiver, a transceiver, a transceiver circuit, or the like. The receiving unit may also be sometimes referred to as a receiver, a receiver, a receiver circuit, or the like. The sending unit may also be sometimes referred to as a transmitter, a transmitter, a transmitter circuit, or the like.

It should be understood that the transceiver unit 1110 is configured to perform the sending operation and the receiving operation on a terminal device side in the foregoing method embodiments, and the processing unit 1120 is configured to perform an operation other than the receiving operation and the sending operation of the terminal device in the foregoing method embodiments.

For example, in an implementation, the transceiver unit 1110 is configured to perform the sending operation on the terminal device side in step S202 in FIG. 2, and/or the transceiver unit 1110 is further configured to perform other sending and receiving steps on the terminal device side in the embodiments of this application.

For another example, in another implementation, the transceiver unit 1110 is configured to perform the sending operation on the terminal device side in step S202 in FIG. 3, and/or the transceiver unit 1110 is further configured to perform other sending and receiving steps on the terminal device side in the embodiments of this application.

For still another example, in still another implementation, the transceiver unit 1110 is configured to perform the sending operation on the terminal device side in step S405 in FIG. 4, and/or the transceiver unit 1110 is further configured to perform other sending and receiving steps on the terminal device side in the embodiments of this application. The processing unit 1120 is configured to perform the processing steps performed by the terminal device in steps S402, S403, and S404 in FIG. 4, and/or the processing unit 1120 is further configured to perform another processing step on the terminal device side in the embodiments of this application.

When the communication apparatus is a chip, the chip includes a transceiver unit and a processing unit. The transceiver unit may be an input/output circuit or a communication interface. The processing unit is a processor, a microprocessor, or an integrated circuit integrated on the chip.

Figure 20:
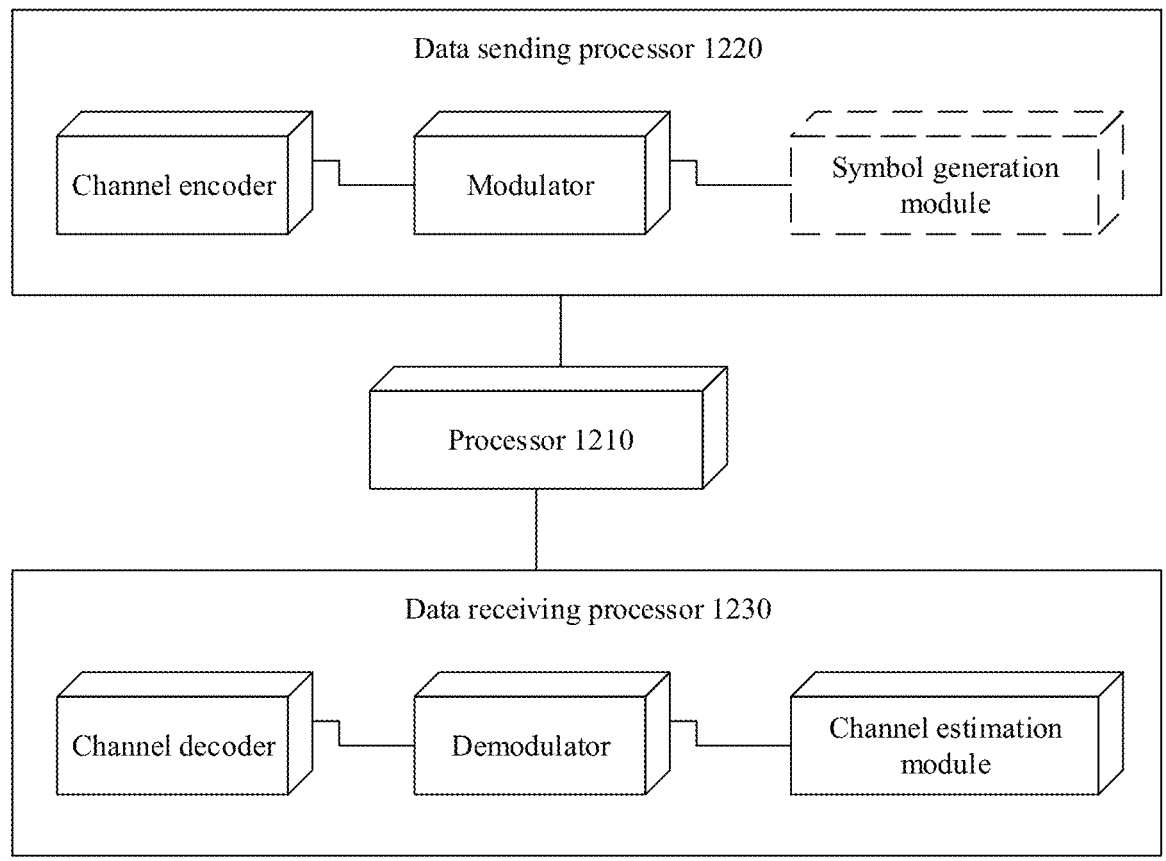
FIG. 20 is another schematic block diagram of a BWP adjustment apparatus according to an embodiment of this application.

When a BWP adjustment apparatus in this embodiment is a terminal device, refer to a device shown in FIG. 20. In an example, the device can implement a function similar to the function of the processor 1703 in FIG. 17. In FIG. 20, the device includes a processor 1210, a data sending processor 1220, and a data receiving processor 1230. The processor 1703 in the foregoing embodiment may be the processor 1210 in FIG. 20, and completes a corresponding function. The receiver 1701 or the transmitter 1702 in the foregoing embodiment may be the data sending processor 1220 and/or the data receiving processor 1230 in FIG. 20. Although FIG. 20 shows a channel encoder and a channel decoder, it may be understood that these modules are merely examples, and do not constitute a limitation on this embodiment.

Figure 21:
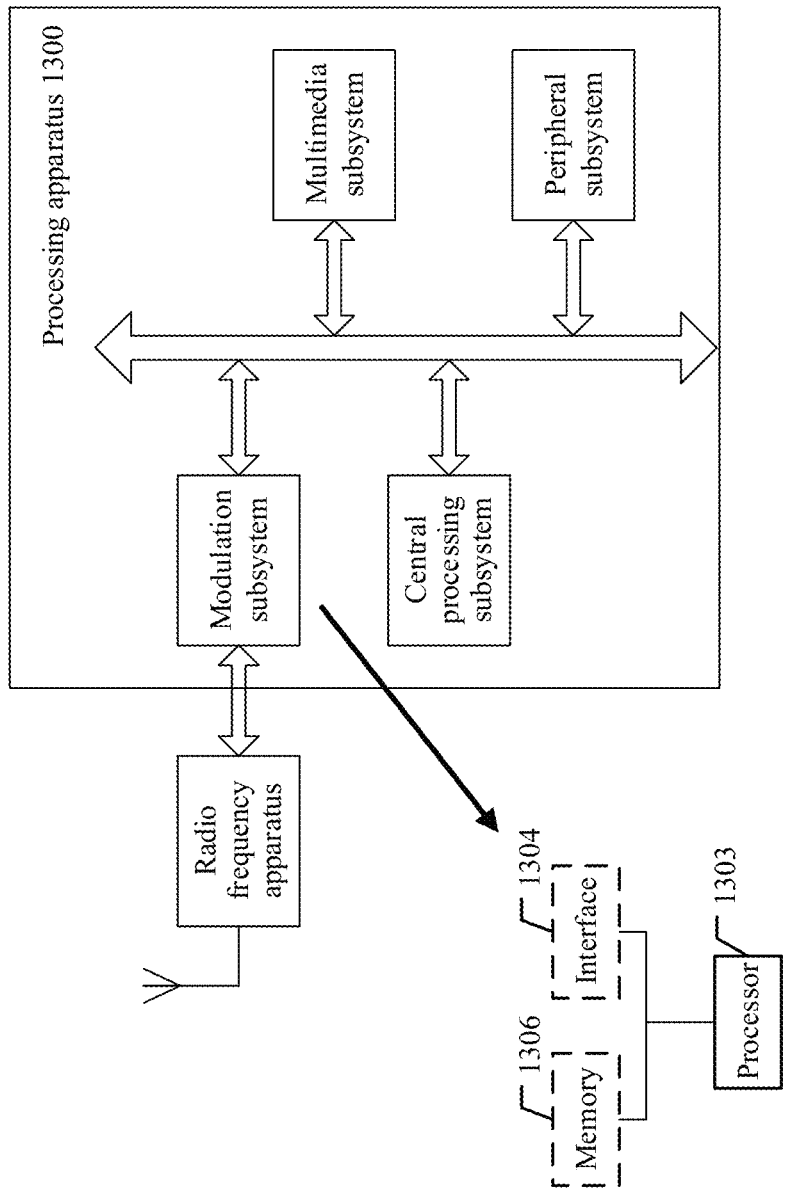
FIG. 21 is still another schematic block diagram of a BWP adjustment apparatus according to an embodiment of this application.

FIG. 21 shows another form of this embodiment. A processing apparatus 1300 includes modules such as a modulation subsystem, a central processing subsystem, and a peripheral subsystem. The BWP adjustment apparatus in this embodiment may be used as the modulation subsystem in the processing apparatus 1300. Specifically, the modulation subsystem may include a processor 1303 and an interface 1304. The processor 1303 implements a function of the processing module 710, and the interface 1304 implements a function of the transceiver module 720. In another variation, the modulation subsystem includes a memory 1306, a processor 1303, and a program that is stored in the memory 1306 and that can run on the processor. When executing the program, the processor 1303 implements the method on the terminal device side in the foregoing method embodiments. It should be noted that the memory 1306 may be a non-volatile memory, or may be a volatile memory. The memory 1306 may be located in the modulation subsystem, or may be located in the processing apparatus 1300, provided that the memory 1306 can be connected to the processor 1303.

Figure 22:
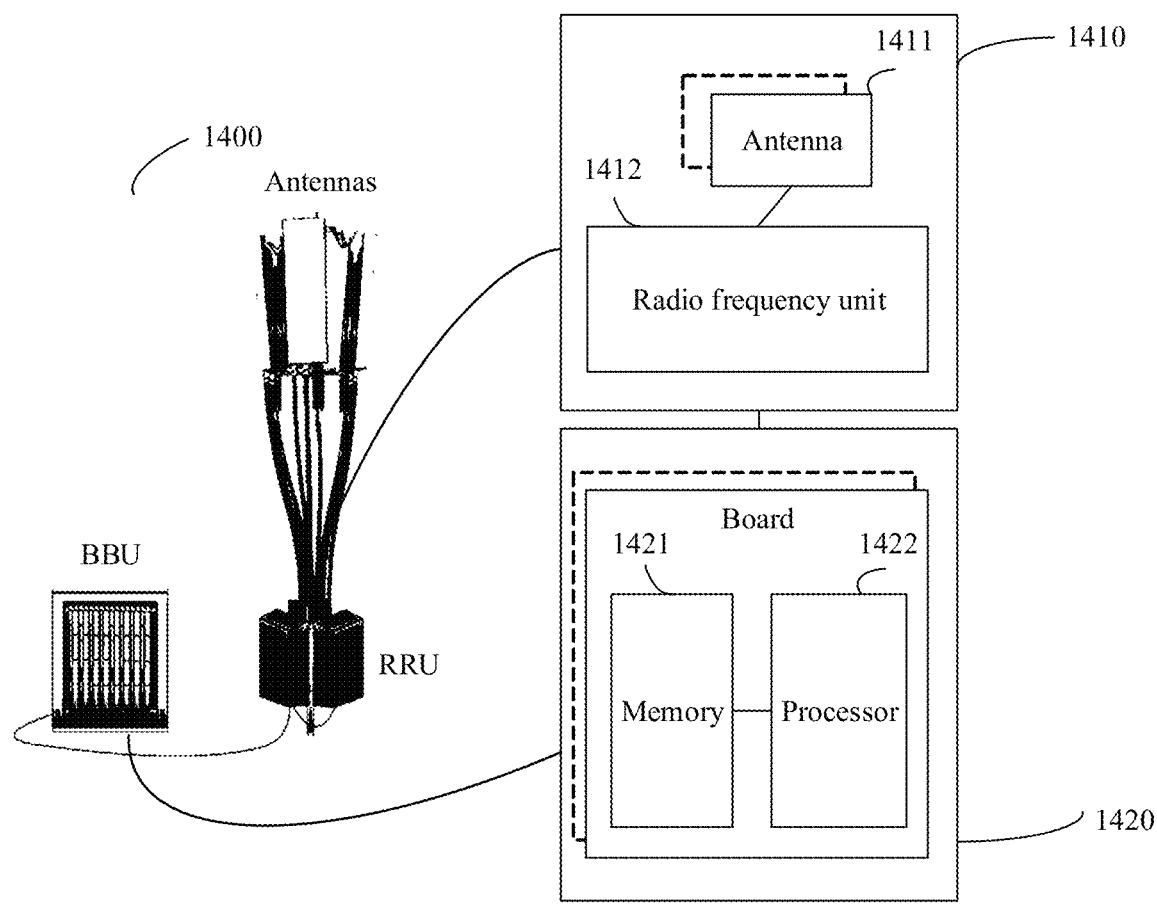
FIG. 22 is still another schematic block diagram of a BWP adjustment apparatus according to an embodiment of this application.

When the apparatus in this embodiment is a network device, the network device may be shown in FIG. 22. An apparatus 1400 includes one or more radio frequency units, such as a remote radio unit (RRU) 1410 and one or more baseband units (BBU) (which may also be referred to as digital units, DUs) 1420. The RRU 1410 may be referred to as a transceiver module, and corresponds to the transmitter 1802 in FIG. 18. Optionally, the transceiver module may also be referred to as a transceiver, a transceiver circuit, a transceiver, or the like, and may include at least one antenna 1411 and a radio frequency unit 1412. The RRU 1410 is mainly configured to: send and receive a radio frequency signal, and perform conversion between the radio frequency signal and a baseband signal. For example, the RRU 1410 is configured to send indication information to a terminal device. The BBU 1420 is mainly configured to: perform baseband processing, control a base station, and so on. The RRU 1410 and the BBU 1420 may be physically disposed together, or may be physically separated, in other words, in a distributed base station.

The BBU 1420 is a control center of the base station, and may also be referred to as a processing module. The BBU 1420 may correspond to the processor 1801 in FIG. 18, and is mainly configured to implement a baseband processing function such as channel coding, multiplexing, modulation, or spreading. For example, the BBU (processing module) may be configured to control the base station to perform an operation procedure related to the network device in the foregoing method embodiments, for example, generate the foregoing indication information.

In an example, the BBU 1420 may include one or more boards, and a plurality of boards may jointly support a radio access network (such as an LTE network) having a single access standard, or may separately support radio access networks (for example, an LTE network, a 5G network, or another network) having different access standards. The BBU 1420 further includes a memory 1421 and a processor 1422. The memory 1421 is configured to store necessary instructions and data. The processor 1422 is configured to control the base station to perform a necessary action, for example, is configured to control the base station to perform an operation procedure related to the network device in the foregoing method embodiments. The memory 1421 and the processor 1422 may serve the one or more boards. In other words, a memory and a processor may be independently disposed on each board, or a plurality of boards may share a same memory and a same processor. In addition, a necessary circuit may be further disposed on each board.

It should be understood that, the processor mentioned in the embodiments of the present invention may be a central processing unit (CPU), or may be another general purpose processor, a digital signal processor (DSP), an application-specific integrated circuit (ASIC), a field programmable gate array (FPGA) or another programmable logic device, a discrete gate or a transistor logic device, a discrete hardware component, or the like. The general purpose processor may be a microprocessor, or the processor may be any conventional processor or the like.

It should be further understood that the memory mentioned in the embodiments of the present invention may be a volatile memory or a non-volatile memory, or may include a volatile memory and a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache. Through example but not limitative description, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM).

It should be noted that when the processor is a general purpose processor, a DSP, an ASIC, an FPGA or another programmable logic device, a discrete gate or a transistor logic device, or a discrete hardware component, the memory (a storage module) is integrated into the processor.

It should be noted that the memory described in this specification aims to include but is not limited to these memories and any memory of another proper type.

It should be further understood that "first", "second", "third", "fourth", and various numbers in this specification are merely used for differentiation for ease of description, and are not construed as a limitation to the scope of this application.

It should be understood that the term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between associated objects.

It should be understood that sequence numbers of the foregoing processes do not mean execution sequences in various embodiments of this application. The execution sequences of the processes should be determined according to functions and internal logic of the processes, and should not be construed as any limitation on the implementation processes of the embodiments of the present invention.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the division into units is merely division into logical functions and may be other division in an actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separate, and parts displayed as units may or may not be physical units, in other words, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units may be integrated into one unit.

When the functions are implemented in a form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A bandwidth part (BWP) adjustment method, comprising:
   receiving, in a first BWP, first indication information sent by a network side device, wherein the first indication information indicates information about a second BWP to be used by a terminal device to receive or send data, and wherein the first indication information indicates the terminal device to enter a sleep state or a wake-up state;
   determining whether a bandwidth of the first BWP is different from a bandwidth of the second BWP;
   in response to determining that the bandwidth of the first BWP is different from the bandwidth of the second BWP, switching an operating BWP from the first BWP to the second BWP;
   receiving or sending the data in the second BWP; and
   in response to a quantity of times for which the terminal device switches from the first BWP to the second BWP being greater than a preset threshold, maintaining the second BWP as the operating BWP after an active state of the terminal device ends.

2. The method according to claim 1, comprising:
   receiving, in the first BWP, second indication information sent by the network side device, wherein the second indication information is a go to sleep (GTS) signal, and wherein the GTS signal comprises the information about the second BWP.

3. The method according to claim 2, wherein the method further comprises:
in response to the bandwidth of the first BWP being different from the bandwidth of the second BWP, controlling the terminal device to enter the sleep state.

4. The method according to claim 3, wherein the switching an operating BWP from the first BWP to the second BWP comprises:
switching the operating BWP from the first BWP to the second BWP in the sleep state.

5. The method according to claim 2, wherein the GTS signal is downlink control information (DCI), the DCI comprises a bandwidth indication field, and the bandwidth indication field indicates the information about the second BWP.

6. The method according to claim 2, wherein the GTS signal is a sequence-based signal, and wherein the sequence-based signal corresponds to the second BWP.

7. The method according to claim 1, wherein the first indication information is wake up signaling (WUS), and the WUS comprises the information about the second BWP.

8. The method according to claim 7, wherein the method further comprises:
in response to the bandwidth of the first BWP being different from the bandwidth of the second BWP:
determining that the terminal device is to enter the active state and switching the operating BWP from the first BWP to the second BWP; and
determining that the active state of the terminal device ends and switching the operating BWP from the second BWP to the first BWP.

9. The method according to claim 8, wherein:
the determining that the terminal device is to enter the active state and switching the operating BWP from the first BWP to the second BWP comprises switching the operating BWP from the first BWP to the second BWP before the terminal device enters the active state; and
the determining that the active state of the terminal device ends and switching the operating BWP from the second BWP to the first BWP comprises switching the operating BWP from the second BWP to the first BWP after the active state of the terminal device ends.

10. The method according to claim 7, wherein the WUS is a sequence-based signal, and wherein the sequence-based signal corresponds to the second BWP.

11. The method according to claim 1, wherein before the receiving, in a first BWP, first indication information sent by a network side device, the method further comprises:
receiving BWP configuration information sent by the network side device, wherein the BWP configuration information comprises configuration information of an active BWP, an initial BWP, and a default BWP, and the second BWP is the active BWP, the initial BWP, or the default BWP.

12. The method according to claim 1, wherein before the receiving, in a first BWP, first indication information sent by a network side device, the method further comprises:
receiving BWP configuration information sent by the network side device, wherein the BWP configuration information comprises at least two sets of BWP configuration information, and wherein the second BWP is a BWP corresponding to one of the at least two sets of BWP configuration information.

13. The method according to claim 12, wherein the receiving BWP configuration information sent by the network side device comprises:
receiving radio resource control (RRC) signaling sent by the network side device, wherein the RRC signaling comprises the BWP configuration information.

14. The method according to claim 13, wherein the RRC signaling further comprises DRX configuration information respectively corresponding to the at least two sets of BWP configuration information.

15. The method according to claim 12, wherein the method further comprises:
receiving BWP reconfiguration information sent by the network side device; and
updating the at least two sets of BWP configuration information based on the BWP reconfiguration information.

16. The method according to claim 8, wherein the method further comprises:
obtaining a sending time of the WUS; and
receiving, in the first BWP and at the sending time of the WUS, the WUS sent by the network side device.

17. A bandwidth part (BWP) adjustment method, comprising:
determining a second BWP based on data to be received or sent by a terminal device; and
sending first indication information to the terminal device in a first BWP, wherein the first indication information indicates information about the second BWP to be used by the terminal device to receive or send the data, wherein the first indication information indicates the terminal device to enter a sleep state or a wake-up state, wherein the terminal device determines whether a bandwidth of the first BWP is different from a bandwidth of the second BWP, wherein in response to a determination that the bandwidth of the first BWP is different from the bandwidth of the second BWP, the terminal device switches an operating BWP from the first BWP to the second BWP, and wherein in response to a quantity of times for which the terminal device switches from the first BWP to the second BWP being greater than a preset threshold, the terminal device maintains the second BWP as the operating BWP after an active state of the terminal device ends.

18. A bandwidth part (BWP) adjustment apparatus, comprising:
at least one processor; and
one or more memories coupled to the at least one processor and storing programming instructions for execution by the at least one processor to:
receive, in a first BWP, first indication information sent by a network side device, wherein the first indication information indicates information about a second BWP to be used by a terminal device to receive or send data, and wherein the first indication information indicates the terminal device to enter a sleep state or a wake-up state;
determine whether a bandwidth of the first BWP is different from a bandwidth of the second BWP;
in response to determining that the bandwidth of the first BWP is different from the bandwidth of the second BWP, switch an operating BWP from the first BWP to the second BWP;
receive or send the data in the second BWP; and
in response to a quantity of times for which the terminal device switches from the first BWP to the second BWP being greater than a preset threshold, maintain the second BWP as the operating BWP after an active state of the terminal device ends.

19. The apparatus according to claim 18, wherein the programming instructions are for execution by the at least one processor to:
receive, in the first BWP, second indication information sent by the network side device, wherein the second indication information is a go to sleep (GTS) signal, and wherein the GTS signal comprises the information about the second BWP.

20. The apparatus according to claim 19, wherein the programming instructions are for execution by the at least one processor to:
in response to the bandwidth of the first BWP being different from the bandwidth of the second BWP, control the terminal device to enter the sleep state.

* * * * *